(12) United States Patent
Oe

(10) Patent No.: US 11,221,783 B2
(45) Date of Patent: Jan. 11, 2022

(54) INFORMATION PROCESSING APPARATUS AND NON-TRANSITORY COMPUTER-READABLE RECORDING MEDIUM HAVING STORED THEREIN INFORMATION PROCESSING PROGRAM

(71) Applicant: FUJITSU LIMITED, Kawasaki (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 159 days.

(21) Appl. No.: 16/786,019

(22) Filed: Feb. 10, 2020

(65) Prior Publication Data

US 2020/0293217 A1  Sep. 17, 2020

(30) Foreign Application Priority Data

Mar. 11, 2019 (JP) .............................. JP2019-043374

(51) Int. Cl.
*G06F 3/06* (2006.01)

(52) U.S. Cl.
CPC ............ *G06F 3/0647* (2013.01); *G06F 3/067* (2013.01); *G06F 3/0611* (2013.01); *G06F 3/0614* (2013.01); *G06F 3/0653* (2013.01); *G06F 3/0659* (2013.01); *G06F 3/0683* (2013.01)

(58) Field of Classification Search
CPC .... G06F 3/0657; G06F 3/0653; G06F 3/0659; G06F 3/0683; G06F 3/0614; G06F 3/067; G06F 3/0611; G06F 3/0605; G06F 3/0685
See application file for complete search history.

(56) References Cited

U.S. PATENT DOCUMENTS

| | | | |
|---|---|---|---|
| 2014/0359215 A1* | 12/2014 | Ogihara | G06F 3/0611 711/114 |
| 2015/0301757 A1* | 10/2015 | Iwata | G06F 12/0871 711/114 |
| 2016/0371016 A1 | 12/2016 | Oe | |
| 2017/0024147 A1 | 1/2017 | Iwata | |

FOREIGN PATENT DOCUMENTS

| | | |
|---|---|---|
| JP | 2012-038212 A | 2/2012 |
| JP | 2017-010196 A | 1/2017 |
| JP | 2017-027301 A | 2/2017 |

OTHER PUBLICATIONS

An IP.com Prior Art Database Technical Disclosure, "Migration onDemand", Jan. 20, 2005. (Year: 2005).*

* cited by examiner

*Primary Examiner* — Khoa D Doan
(74) *Attorney, Agent, or Firm* — Fujitsu Patent Center

(57) ABSTRACT

An apparatus includes a memory that stores information managing whether a writing access to a storing region of a first storing device is present or absent for each of second-sized partial regions obtained by dividing a first-sized storing region by a given value; and a processor configured to: in response to an instruction to migrate first-sized target data from the first storing device to a second storing device having an access speed lower than that of the first storing device, when a number of accessed partial regions in a storing region of the target data is larger than a threshold, migrating the target data in a unit of the first size; otherwise migrating data in the accessed partial regions in a unit of the second size; calculating a first/second migration time periods that the migrations of the first/second size takes; and changing the threshold based on the calculating.

10 Claims, 27 Drawing Sheets

FIG.3

EXAMPLE OF IO ACCESS DATA

| ID | IO NUMBER | Timestamp |
|----|-----------|-----------|
| 0  | 10        | 1         |
| 1  | 12        | 2         |
| :  | :         | :         |

FIG.4

EXAMPLE OF MIGRATION CANDIDATE TABLE

| Group ID | Start sub-LUN | End sub-LUN | IO NUMBER |
|---|---|---|---|
| 0 | 4 | 6 | 50 |
| 1 | 36 | 40 | 40 |
| : | : | : | : |

EXAMPLE OF IO ACCESS CONCENTRATION

FIG.12

EXAMPLE OF TIER TABLE

| DIMM OFFSET | SSD OFFSET | STATUS |
|---|---|---|
| 0 | 268435456 | allocated |
| 2097152 | 306184192 | Moving(SSD→DIMM) |
| 4194304 | 505413632 | Moving(DIMM→SSD) |
| 6291456 | NULL | free |
| : | : | : |

FIG.19

EXAMPLE OP MEASURED DATA

| ET[ms] | timestamp |
|---|---|
| 10000 | xxxxx |
| : | : |

| et[ms] | timestamp |
|---|---|
| 110 | yyyyy |
| : | : |

MIGRATION INSTRUCTOR

INFORMATION PROCESSING APPARATUS AND NON-TRANSITORY COMPUTER-READABLE RECORDING MEDIUM HAVING STORED THEREIN INFORMATION PROCESSING PROGRAM

CROSS-REFERENCE TO RELATED APPLICATION

This application is based upon and claims the benefit of priority of the prior Japanese Patent application No. 2019-043374, filed on Mar. 11, 2019, the entire contents of which are incorporated herein by reference.

FIELD

The embodiment discussed herein relates to an information processing apparatus and a non-transitory computer-readable recording medium having stored therein an information processing program.

BACKGROUND

As a storage system that stores data, a tiered storage system formed by combining multiple storing media (storing devices) is sometimes used. The multiple storing media may include a high-speed storing device (first storing device) that enables a high-speed access and a low-speed storing device (second storing device) having a relatively low speed.

In a tiered storage system, occurrence of Input-Output (IO) accesses is sometimes concentrated on a particular narrow storing region. One of the known manners of avoiding performance degrading due to such concentration of IO accesses is to increase the using efficiency of a high-speed storing device by, for example, arranging data stored in a storing region less frequently accessed into the low-speed storing device and arranging data stored in a storing region on which accesses are concentrated into a high-speed storing device.

Besides, another known manner predicts a storing region on which IO accesses are to be concentrated, and determines a candidate storing region (Down candidate) to be arranged into a low-speed storing device and a candidate storing region (up candidate) to be arranged into a high-speed storing device.

[Patent Document 1] Japanese Laid-open Patent Publication No. 2017-010196

[Patent Document 2] Japanese Laid-open Patent Publication No. 2012-038212

[Patent Document 3] Japanese Laid-open Patent Publication No. 2017-027301

In the above manner, in cases where both a storing region of a Down candidate and a storing region an Up candidate exist concurrently, the Up candidate is preferentially treated and accordingly the data in the storing region of the Up candidate is arranged into the high-speed storing device.

However, the storing regions of the Up candidates may include a storing region not having a large IO access number and therefore bringing small effect in improving the performance (e.g., reducing the average responding time) of the tiered storage system even if being arranged into a high-speed storing device. In cases where such a storing region is arranged into a high-speed storing device, a consumption amount of high-speed storing device would increase and may degrade the efficiency in data migration between the high-speed storing device and the low-speed storing device.

SUMMARY

According to an aspect of the embodiments, an information processing apparatus may include a first memory that stores management information managing whether a writing access to write data into a storing region of a first storing device is present or absent for each of partial regions each having a second size and being obtained by dividing a storing region having a first size by a given value; and a processor being coupled to the first memory and is configured to execute a procedure. The procedure may include: in response to an execution instructions to migrate target data having the first size from the first storing device to a second storing device having an access speed lower than that of the first storing device, when a number of accessed partial regions subjected to a writing access in a storing region of the target data is larger than a threshold with reference to the management information, migrating the target data from the first storing device to the second storing device in a unit of the first size; when the number of partial regions subjected to the writing access in the storing region of the target data is equal to or smaller than the threshold, migrating data in the accessed partial regions of the target data from the first storing device to the second storing device in a unit of the second size; calculating a first migration time period that migration from the first storing device to the second storing device in a unit of the first size takes and a second migration time period that migration from the first storing device to the second storing device in a unit of the second size takes; and changing the threshold based on a result of the calculating the first migration time period and the second migration time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of IO access information;

FIG. 4 is a diagram illustrating an example of a migration candidate table;

FIG. 12 is a diagram illustrating an example of a tier table;

FIG. 19 is a diagram illustrating an example of measured data stored in a measured data storing unit;

DESCRIPTION OF EMBODIMENT(S)

Hereinafter, an embodiment of the present invention will now be detailed with reference to accompanying drawings. The following embodiment is exemplary and there is no intention to exclude various modifications and applications of techniques not explicitly referred in the first embodiment. In other words, various changes and modifications can be suggested without departing from the scope of the embodiment. Throughout the drawings, like reference numbers designate the same or substantially same parts and elements unless otherwise specified.

Figure 1:
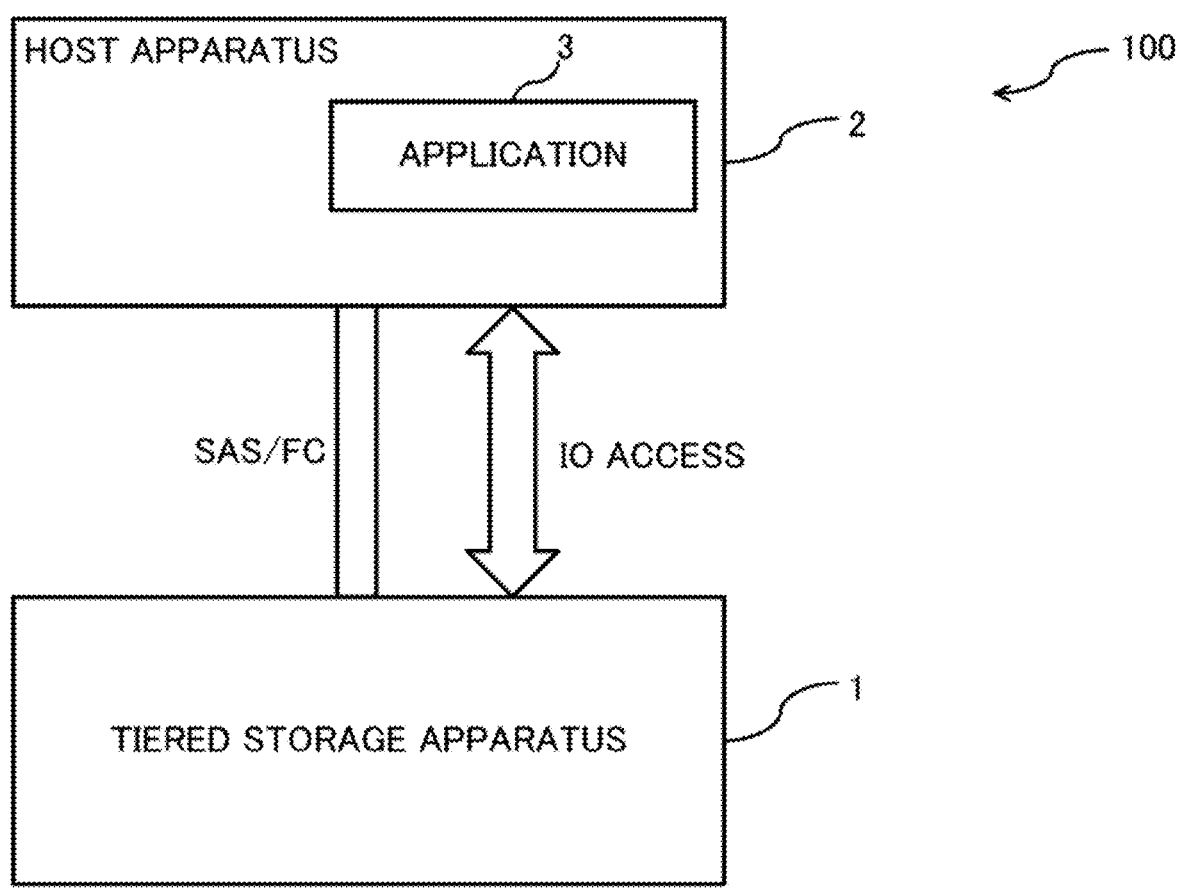
FIG. 1 is a block diagram schematically illustrating an example of the configuration of a tiered storage system according to an example of an embodiment.

<<1>> Configuration:

<<1-1>> Example of Configuration of Storage System:

FIG. 1 is a diagram illustrating an example of the configuration of a storage system 100 including a tiered storage apparatus 1 according to an embodiment of the present embodiment.

As illustrated in FIG. 1, the storage system 100 exemplarily include a host apparatus 2, such as a Personal Computer (PC) or a server, and a tiered storage apparatus 1. The host apparatus 2 and the tiered storage apparatus 1 may be connected to each other via an interface (IF) such as a Serial Attached Small Computer System Interface (SAS) or a Fiber Channel (FC).

The host apparatus 2 may include a processor such as a non-illustrated Central Processing Unit (CPU) and may achieve various functions through executing an application 3 by the processor.

The tiered storage apparatus 1 is an example of the storage device and, as to be detailed below, may include multiple types of storing devices having different performance. The storing regions of these storing devices may be provided to the host apparatus 2. In the storing regions that the tiered storage apparatus 1 provides, data generated by the host apparatus 2 executing the application 3 and data used to execute the application 3 may be stored.

IO accesses are generated when the host apparatus 2 reads data from and writes data into the storing regions of the tiered storage apparatus 1.

Figure 2:
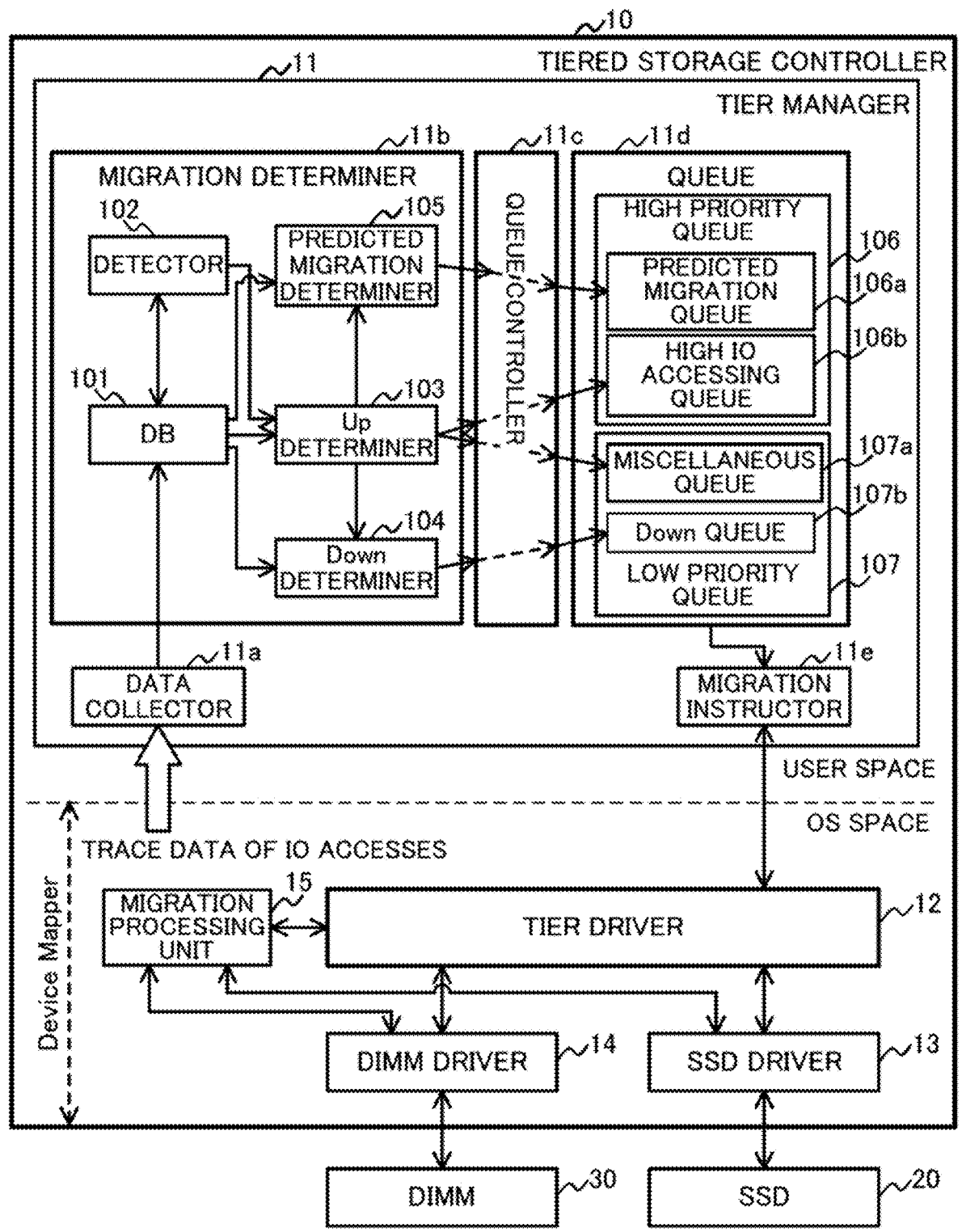
FIG. 2 is a block diagram illustrating an example of the configuration of a tiered storage apparatus according to an example of the embodiment.

<<1-2>> Example of Functional Configuration of Tiered Storage Apparatus:

FIG. 2 is a diagram illustrating an example of the functional configuration of the tiered storage apparatus 1 according to an example of the present embodiment. As illustrated in FIG. 2, the tiered storage apparatus 1 may exemplarily include a tiered storage controller 10, a Solid State Drive (SSD) 20, and a Dual Inline Memory Module (SIMM) 30.

The tiered storage controller 10 is an example of a storage controlling apparatus that makes various accesses to the SSD 20 and the DIMM 30 in accordance with IO accesses from the host apparatus 2. For example, the tiered storage controller 10 may make accesses for reading and writing to the SSD 20 and the DIMM 30. An example of the tiered storage controller 10 is an information processing apparatus such as a PC, a server, or a Controller Module (CM).

The tiered storage controller 10 of the present embodiment may achieve dynamic tier control that arranges a region having a low access frequency into the SSD 20 and arranges a region having a high access frequency into the DIMM 30 in accordance with the IO accesses frequency.

The DIMM 30 is an example of a high-speed storing device or a first storing device (first storing unit) that stores various data and programs. An example of the DIMM 30 may be a semiconductor memory module such as Non-Volatile Memory (NVM). In the present embodiment, multiple Block Devices (BDs) may be exemplarily generated in the storing region of the DIMM 30 and the storing region may be accessed in units of a BD.

The SSD 20 is an example of a low-speed storing device or a second storing device (second storing unit) having a different performance (e.g., a lower access speed) from that of the DIMM 30. In the present embodiment, the SSD 20 may be exemplarily connected to the tiered storage controller 10 via a standard confirming to NVM Express (NVMe) using Peripheral Component Interconnect Express (PCIe).

In the present embodiment, an example of a combination of different storing devices is a combination of a semiconductor memory module such as a DIMM 30 and a semiconductor drive device such as an SSD 20, but the combination is not limited to this example. As the first storing device and the second storing device, various storing devices having a performance difference (e.g., a difference of speed of a reading/writing IO access) may be used.

The SSD 20 and the DIMM 30 described above may serve as one or more storage volumes of the tiered storage apparatus 1.

Hereinafter, a single storage volume recognized by, for example, the host apparatus 2 is referred to as a Logical Unit Number (LUN). Further, a unit (unit region) obtained by dividing a LUN by a predetermined size is referred to as a sub-LUN. The size of a sub-LUN can be appropriately changed in order of MegaByte (MB) to GigaByte (GB). A sub-LUN may be also referred to a segment and a unit region.

Each of the SSD 20 and the DIMM 30 includes a storing region that can store data of sub-LUNs (unit regions) on the storage volume. The tiered storage controller 10 may control region migration between the SSD 20 and the DIMM 30 in a unit of a sub-LUN.

The tiered storage apparatus 1 of FIG. 2 is assumed to include a single SSD 20 and a single DIMM 30, and is not limited to this configuration. Alternatively, the tiered storage apparatus 1 may include multiple SSDs 20 and multiple DIMMs 30.

Next, description will now be made in relation to details of the tiered storage controller 10. As illustrated in FIG. 2, the tiered storage controller 10 may exemplarily include a tier manager 11, a tier driver 12, an SSD driver 13, a DIMM driver 14, and a migration processing unit 15. Here, the tier manager 11 may be achieved in the form of a program executed in a user space, and the tier driver 12, the SSD driver 13, the DIMM driver 14, and the migration processing unit 15 may be achieved by a program executed in an Operating System (OS) space.

In the present embodiment, the tiered storage controller 10 is assumed to use a function of Linux (registered trademark) device-mapper, for example. The device-mapper monitors the storage volume in units of sub-LUNs and processes an IO to a highly-loaded region by migrating data in a highly-loaded sub-LUN from the SSD 20 to the DIMM 30. The device mapper may be implemented in the form of a computer program.

The tier manager 11 may specify (extract a migration candidate) a sub-LUN storing data that is to be migrated from the SSD 20 to the DIMM 30 by analyzing data accesses to the sub-LUNs. Furthermore, the tier manager 11 may control migration of data of a sub-LUN from the SSD 20 to the DIMM 30 and migration of data of a sub-LUN from the DIMM 30 to the SSD 20.

The tier manager 11 determines a sub-LUN to be subjected to region migration on the basis of information of an IO traced for the SSD 20 and/or the DIMM 30, for example, and instructs the tier driver 12 to migrate data in the determined sub-LUN.

The tier driver 12 distributes IO requests directed to the storage volumes from the user to the SSD driver 13 or the DIMM driver 14, and replies to the user with the IO responses from the SSD driver 13 or the DIMM driver 14.

Upon receipt of a migration instruction (segment migration instruction) of a sub-LUN from the tier manager 11, the tier driver 12 carries out a migration process that migrates data stored in a unit region of the migration target in the DIMM 30 or the SSD 20 to the SSD 20 or the DIMM 30. The migration process may include issue of a forwarding instruction of data to the migration processing unit 15.

The SSD driver 13 controls an access to the SSD 20 on the basis of an instruction from the tier driver 12. For example the SSD driver 13 may include a device driver confirming to the NVMe. The device driver may be implemented to be an NVMe driver in Linux.

The DIMM driver 14 controls an access to the DIMM 30 on the basis of an instruction of the tier driver 12. For example, the DIMM driver 14 may include a driver that generates multiple BDs in the storing region of the DIMM 30 and accesses the storing region in units of BD. For example, the device driver may be implemented to be a BRD driver on the Linux®.

The migration processing unit 15 carries out data migration (forwarding) between the SSD 20 and the HDD 30. Upon completion of data forwarding, the migration processing unit 15 may transmit completion notification to the tier driver 12. An example of the migration processing unit 15 is kcopyd implemented on the device-mapper. The kcopyd is a module (program) that achieves data copying between devices and is executed in the OS space.

<<1-2-1>> Description of Tier Manager:

As illustrated in FIG. 2, the tier manager 11 may exemplarily include functions as a data collector 11a, a migration determiner 11b, a queue controller 11c, a queue 11d, and a migration instructor 11e.

For example, the tier manager 11 may be implemented to be a division and configuration-change engine having three components of a Leg Pool, sub-LUN migration determination, and sub-LUN migration instruction on the Linux. The components of the Log Pool, the sub-LUN migration determination, and the sub-LUN migration instruction may achieve the functions as the data collector 11a, the migration determiner 11b and the queue 11d, and the migration instructor 11e, in the FIG. 2, respectively.

<<Description of the Data Collector 11a>>

The data collector 11a may collect information (IO access information) related to IO accesses to the SSD 20 or the DIMM 30, and counts IO access number for each sub-LUN on the basis of the collected information.

For example, the data collector 11a may collect information of an IO obtained by tracing the SSD 20 and/or the DIMM 30 using blktrace of the Linux. The data collector 11a may collect information such as timestamp, logical Block Addressing (LBA), read/write (r/w), and a length by means of IO tracing. Here, a sub-LUN ID can be obtained from LBA.

Here, blktrace is a command that traces an IO on the block IO level. Alternatively, the data collector 11a may collect IO access information by using another manner such as iostat, which is a command to check the using state of the disk IO, in place of blktrace. The commands of blktrace and iostat may be executed in the OS space.

The data collector 11a may collect information related to IO accesses for each sub-LUN at predetermined regular time intervals (t). For example, in cases where the tier manager 11 makes migration determination for a sub-LUN at intervals of T seconds (where T is an integer of 1 or more), the predetermined regular time interval (t) may be set to T seconds.

The data collector 11a may count reading/writing ratios (rw ratios) of IOs to each segment or/and all the segments, and may add the ratios into the above information.

The data collector 11a may store the collected IO access information into a DB 101 that is to be detailed below and that is included in, for example, the migration determiner 11b.

FIG. 3 is a diagram illustrating an example of IO access information related to the present embodiment. The IO access information is information related to an IO access currently occurring to the SSD 20. In the example of FIG. 3, the IO access information takes a table form, but is not limited to the table form. Alternatively, the IO access information may be stored in the DB 101 in various forms of, for example, a sequence.

As illustrated in FIG. 3, the IO access information may include fields of a sub-LUN ID, the number of IOs, and a timestamp for each sub-LUN. In the example of FIG. 3, the number "10" of IOs and the timestamp "1" are set for a sub-LUN having a sub-LUN ID "0".

A sub-LUN ID is identification information to specify a sub-LUN (entry). An example of the sub-LUN ID is identification information such as the leading offset of a storage volume. The number of IOs may exemplarily be the total number (IOPS; IO per second) of IOs made for each individual sub-LUN per second. The timestamp is an identifier that identifies the time and may be exemplified by the time of the day itself.

As described above, the data collector 11a is an example of collector that collects information related to an IO access request input into each of the unit regions obtained by dividing a regions used by the SSD 20 or the DIMM 30 by a given value.

(Description of Migration Determiner 11b)

The migration determiner 11b selects a sub-LUN from which is data is to be migrated in the SSD 20 or the DIMM 30 on the basis of the IO access information collected by the data collector 11a, and stores the information related to the selected sub-LUN into the queue 11d. The information stored in the queue 11d is output to the migration instructor 11e according to the priority that is to be detailed below.

As illustrated in FIG. 2, the migration determiner 11b may include the DataBase (DB) 101, a detector 102, an Up determiner 103, a Down determiner 104, and a predicted migration determiner 105. The detector 102, the Up determiner 103, the Down determiner 104, and the predicted migration determiner 105 may perform the following operations at the predetermined regular time intervals (t) at which the IO access information is updated. Hereinafter, the process performed at the predetermined regular time intervals (t) is sometimes referred to as a process of a single cycle (interval).

The DB 101 stores information related to the number of IOs that the data collector 11a counts for each sub-LUN and is achieved by a non-illustrated memory, for example.

The detector 102 detects an occurrence of IC access concentration on the SSD 20 on the basis of the IO access information related to IO accesses in units of sub-LUNs.

Here, the IO access concentration is a state where the half the overall IO accesses or more concentrate on a range region of a predetermined percent (e.g., about 0.1% to several %) of the entire volume capacity, for example.

For example, the detector 102 may detect a state (IO access concentrating state) where accesses of the threshold (e.g., about 50-90% to all the IO accesses) or more are concentrated on the predetermined range region described above.

The range region for determining IO access concentration may be a continued single range region or may be the sum of multiple discrete range regions. As an unlimited example, a duration time of a single IO access is about 80 seconds at the longest, and in some short cases, may end within less than one minute.

Additionally, the detector 102 may detect the end of IO access concentration. The end of IO access concentration corresponds to a state where the IO access number to a range region on which the IO access has been hitherto concentrated comes below the above threshold.

In some cases, the number of IOs instantly declines but is then regained immediately. Considering the above, the detector 102 may determine that the IO access concentration ends when a predetermined time (e.g., T seconds) elapses since the IO access number to a range region on which the IO access has been hitherto concentrated comes below the above threshold.

For example, the detector 102 may detect an occurrence of IO access concentration on a region specified by the following steps (A) to (D). The region specified by these steps is a region of a candidate being migrated to the SSD 20 or the DIMM 30. For example, the detector 102 may store information (migration candidate information) related to the specified region into the DB 101.

(A) The detector 102 determines the IOPS to the entire LUN is a predetermined threshold i (where i is a positive real number) or more. In cases where the IOPS to the entire LUN does not exceed the predetermined threshold i, the detector 102 may end the process. In this case, the detector 102 may execute the process (A) again at the next cycle (e.g., T seconds later).

(B) In cases where the IOPS to the entire LUN exceeds the predetermined threshold i, the detector 102 arranges the IO access information for each sub-LUN in the descending order of IO access number, and extracts the top n sub-LUNs (where, n represents an integer). The number n corresponds the maximum sub-LUN number that can be migrated all together, and is calculated by dividing T (seconds) corresponding to an interval to count the number of IOs for each sub-LUN by the migration rate (second/sub-LUN) in a sub-LUN from the SSD 20 to the DIMM 30.

(C) The detector 102 merges the top n sub-LUNs in the descending order of having an IO access number and regards the merged sub-LUNs as a single region (hereinafter sometimes referred to as a sub-LUN group). The detector 102 sums the IO access numbers in the sub-LUN group and rearranges sub-LUN groups in the descending order of IO access number.

(D) The detector 102 accumulates the number of IO accesses to sub-LUN in the descending order of having an IO access numbers and specifies sub-LUN groups subjected to the accumulation until the total IO access number exceeds m % (where, m is a positive actual number) to the overall IO accesses as the migration candidates. The symbol m is a value to opt for (cut off) sub-LUN groups to serve as migration candidates.

FIG. 4 is a diagram illustrating an example of migration candidate information. In the example of FIG. 4, the migration candidate information is illustrated in the form of a table for the convenience. Hereinafter, the migration candidate information in the table form is referred to as a migration candidate table.

As illustrated in FIG. 4, the migration candidate information may include fields of Group ID, Start sub-LUN, End sub-LUN, and the number of IOs for each sub-LUN group. In the example of FIG. 4, for a sub-LUN group having a Group ID "0", Start sub-LUN of "4", the end position (end sub-LUN ID) of "6", and the number "50" of IOs are set.

A Group ID is identification information to specify a sub-LUN group (entry). A Start sub-LUN is information that specifies a sub-LUN at the start point of the IO access concentration region and an End sub-LUN is information that specifies a sub-LUN at the end point of the IO access concentration. Accordingly, the difference (End sub-LUN–Start sub-LUN) represents the number (magnitude) of the region in which IO access concentration is occurring. As one example, the the number of IOs may be the total number (IPOS) of IOs made to a sub-LUN group per second.

The detector 102 may register the migration candidate information specified in the above steps (A) to (D) into the migration candidate table.

The Up determiner 103 evaluates the duration time of the sub-LUN group of the migration candidate on the basis of the migration candidate information, and determines a sub-LUN group on which IO access concentration continues beyond the predetermined threshold to be the migration candidate sub-LUN group. Besides, the Up determiner 103 transmits information (e.g., sub-LUN IDs consisting of the sub-LUN group) related to the determined sub-LUN group and the information of the IO access number to each of the sub-LUNs to the queue controller 11c. The Up determiner 103 may specify the migration candidate sub-LUN group by reading information about the IO access number to the sub-LUNs from the IO access information stored in the DB 101, for example.

For example, the Up determiner 103 may determine a migration candidate sub-LUN group on which IO access concentration continued for a predetermined time period as a migration target (Up target) that is to be migrated from the SSD 20 to the DIMM 30. The predetermined time period may be determined by the product of the time interval (t) (T seconds) for counting the number of IOs for each sub-LUN and the number (c) (interval number) of times of being detected as IO access concentration. For example, in cases where c=3, the Up determiner 103 may determine a sub-LUN group on which IO access concentration has been detected three times as the Up target.

Here, the Up determiner 103 may determine whether or not the IO access concentration ends during the tier migration on the basis of the remaining duration time of the IO access concentration and time that the tier migration takes. The remaining duration time is a time obtained by subtracting the execution time for which IO access concentration has already been executed from the duration time for which the IO access concentration would continue, and is a value determined on the basis of the workload.

For example, the Up determiner 103 calculates the cost (migration time) that the migration candidate sub-LUN group takes to migrate to the DIMM 30 and, in cases where the remaining duration time is the migration time or less, may inhibit the tier migration from the SSD 20 to the DIMM 30.

The calculation of a remaining duration time and the migration control on sub-LUNs using the remaining duration time can be achieved by various known manner, so the detailed description thereof is omitted here.

The Down determiner 104 determines a sub-LUN to be the migration candidate (Down target) to the SSD 20 among the sub-LUNs that have been migrated to the DIMM 30.

For example, the Down determiner 104 may determine a sub-LUN that has not been included in a sub-LUN group of an Up target (i.e., excluded from the range of the sub-LUN group) for predetermined consecutive times (e.g., ten times) to be the Down target. The Down determiner 104 may manage removal information (not illustrated) in which each sub-LUN excluded from the range of the sub-LUN group of the Up target is associated with the consecutive times of being excluded from the range, and may determine a sub-LUN of the Down target using the removal information. Furthermore, in cases where a sub-LUN included in the removal information comes to be included in a sub-LUN group of the Up target, the Down determiner 104 may remove the sub-LUN from the removal information.

The Down determiner 104 may transmit information of a sub-LUN determined to be a Down target to the queue controller 11c.

The predicted migration determiner 105 migrates a sub-LUN of an Up target determined by the detector 102 and the Up determiner 103, and predicts a sub-LUN in which IO access concentration will occur (i.e., in which IO accesses will increase) in near feature. The predicted migration determiner 105 may transmit information of a predicted sub-LUN to the queue controller 11c.

A sub-LUN predicted by the predicted migration determiner 105 is migrated from the SSD 20 to the DIMM 30 before IO access concentration on the same sub-LUN occurs.

Since such predicting migration control makes it possible to migrate data in the sub-LUN to the DIMM 30 before IO access concentration on the sub-LUN occurs, the user IO can be less affected than a case where a sub-LUN on which IO access concentration is currently occurring is migrated to the DIMM 30.

Figure 5:
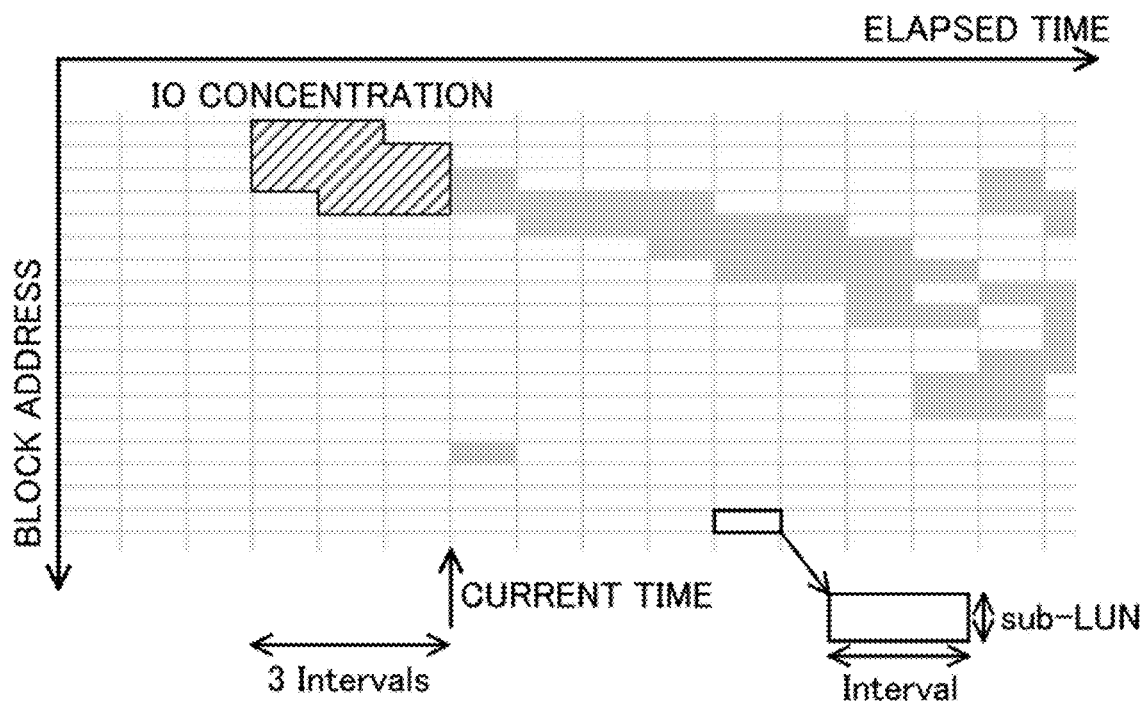
FIG. 5 is a diagram illustrating an example of IO access concentration.

As exemplarily illustrated in FIG. 5, sub-LUNs undergoing IO access concentration shifts as passage of time. This shifting velocity of sub-LUNs is substantially constant.

For the above, the predicted migration determiner 105 obtain a shifting destination region to which the IO access concentration shifts in the near-feature on the basis of the transition velocity of a region on which IO access concentration would occur, and controls migration of the data in the shifting destination region to the DIMM 30 before the IO access concentration on the region occurs.

The predicted migration control achieved by the predicted migration determiner 105 can apply the method described in, for example, the above Patent Document 1.

<<Description of the Queue Controller 11c>>

The queue controller 11c controls storing of information of a sub-LUN serving as a migration target from the SSD 20 to the DIMM 30 or from the DIMM 30 to the SSD 20, which information is transmitted from the migration determiner 11b, into the queue 11d. Hereinafter, storing data may also referred to as "placing data" or "pushing data".

For example, the queue controller 11c stores information of a sub-LUN of a predicted migration target which information is received from the predicted migration determiner 105 into a high priority queue 106 (predicted migration queue 106a) of the queue 11d. In addition, the queue controller 11c stores information of a sub-LUN of a Down target which information is received from the Down determiner 104 into a low priority queue 107 (Down queue 107b) of the queue 11d.

Furthermore, the queue controller 11c selectively stores information of a sub-LUN of an Up target which information is received from the Up determiner 103 into the high priority queue 106 (high IO accessing queue 106b) or the low priority queue 107 (miscellaneous queue 107a) of the queue 11d.

Figure 6:
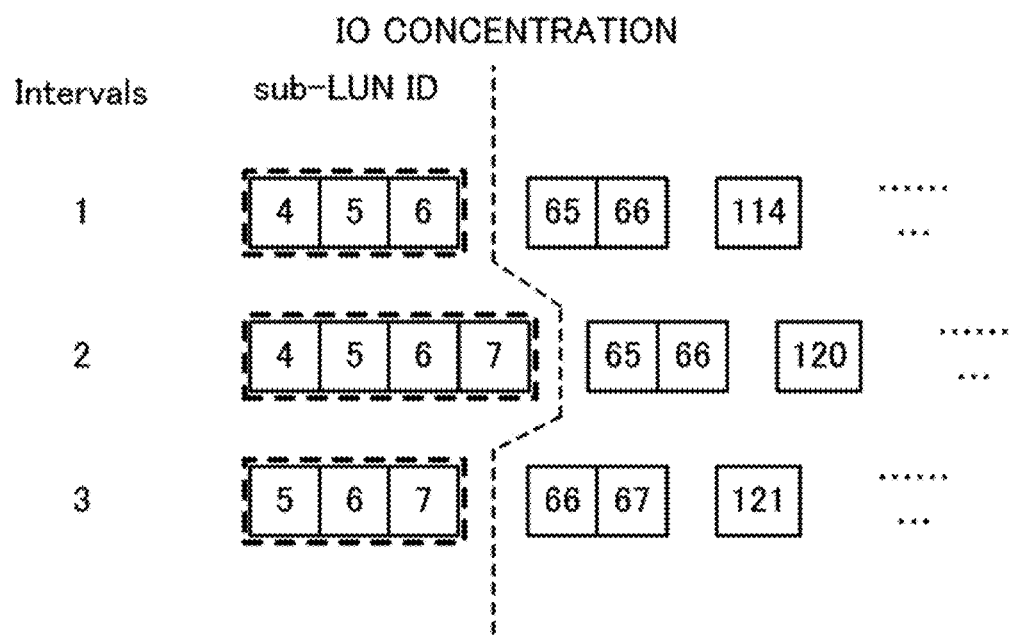
FIG. 6 is a diagram illustrating another example of IO access concentration.

FIGS. 5 and 6 are diagrams illustrating examples of IO access concentration. As illustrated in FIGS. 5 and 6, in a case of c=2, a sub-LUN group (i.e., a group including sub-LUN IDs "4" to "7") in which IO access concentration is continued during two consecutive intervals of Intervals 1 and 2 is detected at Interval 2 is determined to be an Up target.

Here, the sub-LUNs included in one sub-LUN group that the detector 102 determines to be undergoing IO access concentration and that the Up determiner 103 determines to be an Up target may have distributed IO access numbers.

Considering the above, the queue controller 11c of the present embodiment groups multiple sub-LUNs included in the same sub-LUN group determined to be an Up target for each priority according to an IO access number to each sub-LUN, and register the groups one into each of queues having different priorities.

In other words, the queue controller 11c sets a priority of target data for a migration instruction from the SSD 20 to the DIMM 30 on the basis of the access number made to the target data in the DIMM 30.

For example, the queue controller 11c may classify sub-LUNs each having an IO access number of a predetermined threshold or more into a high-priority group, and sub-LUNs each having an IO access number less than the threshold into a low-priority group. The queue controller 11c may distribute each sub-LUN belonging to the sub-LUN group of the Up target to the high-priority group and the low-priority group by comparing the number of IOs (IO number) to each sub-LUN received from the Up determiner 103 and a threshold Th. Here, the threshold Th may be the same as the threshold i that is used in the above step (A) performed by the detector 102. Otherwise, the threshold Th may be a value of an XX % (e.g., 5%) to the overall IO access number.

Figure 7:
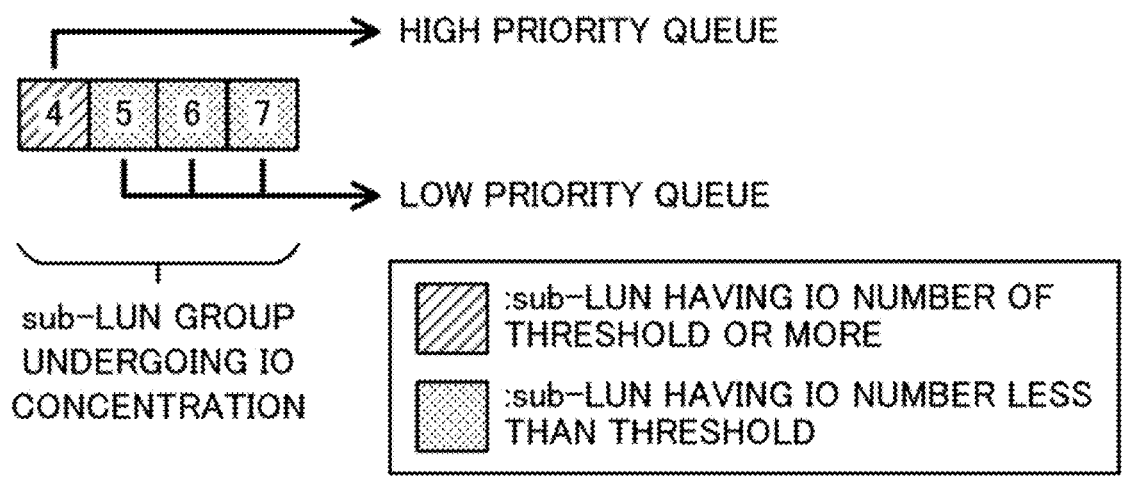
FIG. 7 is a diagram illustrating an example of distributing sub-LUNs to a high-priority queue and a low-priority queue.

FIG. 7 is a diagram illustrating an example of distributing a sub-LUN to the high-priority or low-priority queue by the queue controller 11c. The example of FIG. 7 assumes that, among the sub-LUN IDs "4" to "7" in a sub-LUN group undergoing IO access concentration, the sub-LUN ID "4" has the number of IOs equal to or more than the threshold and the sub-LUN IDs "5" to "7" each have the number of IOs less than the threshold. In this case, the queue controller 11c classifies the sub-LUN ID "4" into a high-priority group and classifies the sub-LUN IDs "5" to "7" into a low-priority group.

The queue controller 11c may register information of a sub-LUN belonging to the high-priority group into the high priority queue 106 (high IO accessing queue 106b) of the queue 11d. Likewise, the queue controller 11c may register information of a sub-LUN belonging to the low-priority group into a low priority queue 107 (miscellaneous queue 107a) of the queue 11d. The queue 11d will be detailed below.

As described above, the migration determiner 11b and the queue controller 11c collectively serve as an example of a determiner that determines target data for a migration process and stores a migration instruction to the determined target data into the queue 11d.

Figure 8:
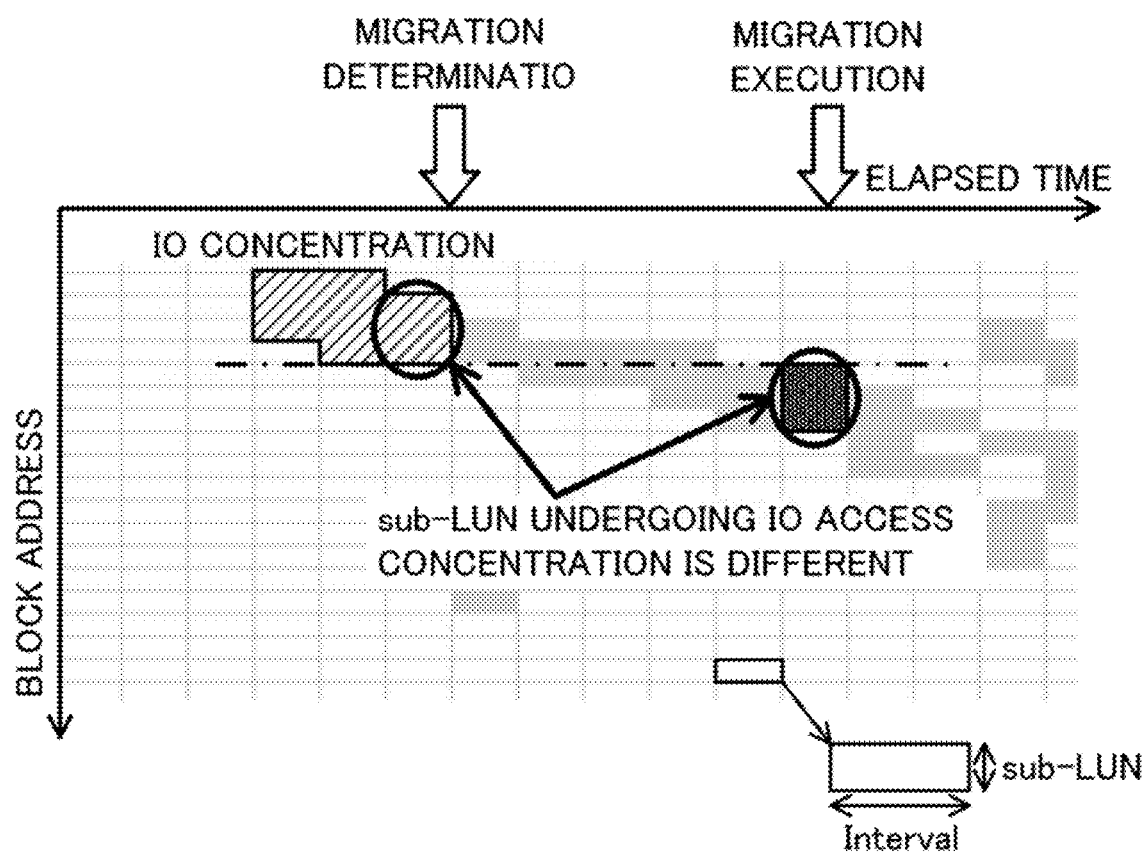
FIG. 8 is a diagram illustrating an example of migrating a sub-LUN on which IO access concentration occurs.

FIG. 8 is a diagram illustrating an example of migration of a sub-LUN in which IO access concentration occurs. As illustrated in FIG. 8, a sub-LUN undergoing IO access concentration has a possibility of shifting to another sub-LUN as the passage of the time. For this reason, in cases where sub-LUNs that were not able to be migrated in the past (the previous time or the earlier times) are accumulated in the queue 11d, a gap may be generated between the timing of the migration determination and the timing of the migration execution.

Generation of a gap between the timing of the migration determination and the timing of the migration execution means a case where the migration determination and the migration execution are carried out at respective different intervals (i.e., a process of one cycle executed by the tier manager 11). In contrast, the timing of the migration determination and the timing of the migration executing being the same as each other means that a case where the timing of the migration determination and the timing of the migration executing are carried out within the same intervals.

In the example of FIG. 8, sub-LUNs in which IO access concentration is occurring at the timing of migration determination are different from sub-LUNs in which IO access concentration is occurring at the timing of the migration execution.

In cases where a gap is generated between the timing of the migration determination and the timing of the migration execution as the above, tier migration on a sub-LUN having an ID registered in the queue 11d at the timing of the migration determination has a possibility of failing in obtaining performance development.

As a solution to the above, the queue controller 11c of the present embodiment may clear (remove or invalidates) all the sub-LUN IDs of the predicted migration targets and the Up targets which IDs are accumulated in the queue 11d at predetermined intervals (e.g., every T seconds). Examples of a storing region of the queue 11d to be cleared by the queue controller 11c are the predicted migration queue 106a and the high IO accessing queue 106b of the high priority queue 106, and the miscellaneous queue 107a of the low priority queue 107.

This means that, the queue controller 11c is an example of a remover that removes, prior to the timing at which a migration instruction for target data determined at the first timing is stored into the queue 11d, a migration instruction, as a removing target, from the SSD 20 to the DIMM 30 determined at the second timing before the first timing from the queue 11d among the migration instructions stored in the queue 11d. Here, the target data for the migration instruction from the SSD 20 to the DIMM 30 is data on which access concentration is occurring or on which access concentration is predicted to occur in the DIMM 30.

This restricts a sub-LUN to be migrated to the DIMM 30 to a sub-LUN determined to be migrated within the same interval as the migration execution, which can raise the possibility of achieving the performance enhancing effect of the tiered storage controller 10.

The Down queue 107b of the low priority queue 107 is not regarded as a clear target and the queue controller 11c leaves one or more sub-LUN IDs of the Down target in the queue 11d, which means the sub-LUN IDs of the Down targets are exclude from the removing target. Accordingly, information of a sub-LUN of a Down target that was not able to be migrated to the SSD 20 in the past may be accumulated in the Down queue 107b.

Since a sub-LUN in which IO access concentration occurs tends to be shifted to another sub-LUN as the passage of time as described the above, the sub-LUN the same as the sub-LUN of the Down target may be determined to be the predicted migration target of the Up target in the current migration determination process.

As a solution to this case, the queue controller 11c may prevent the same sub-LUN ID from being redundantly registered in the high priority queue 106 for a predicted migration target or an Up target and the miscellaneous queue 107a, and the Down queue 107b for a Down target, in the queue 11d.

For example, the queue controller 11c compares each of the sub-LUN IDs currently registered in the Down queue 107b with the sub-LUN ID of the predicted migration targets and the Up targets received from the predicted migration determiner 105 and the Up determiner 103, respectively. Then the queue controller 11c may remove a sub-LUN ID matched as a result of the comparison from the Down queue 107b.

In other words, in cases where a storing region indicated by a migration instruction from the SSD 20 to the DIMM 30 determined at a first timing matches a storing region indicated by a migration instruction from the DIMM 30 to the SSD 20 determined at a second timing prior to the first timing, the queue controller 11c removes the migration instruction from the DIMM 30 to the SSD 20 from the queue 11d.

This can inhibit data of a sub-LUN which is to be or has been migrated to the DIMM 30 and in which IO access concentration is to occur from being migrated to the SSD 20 in obedience to an instruction that was registered into the Down queue 107b in the pact. Accordingly, it is possible to lower a possibility of degrading the performance of the tiered storage controller 10.

<<Description of Queue 11d>>

The queue 11d is a storing region having a First-In First Out (FIFO) configuration that temporarily stores information (e.g., the ID) of a sub-LUN of a migration target, and may be achieved by, for example, a non-illustrated memory.

The queue 11d may store a migration instruction that instructs data migration between the DIMM 30 and the SSD 20, which has an access speed lower than that of the DIMM 30.

As illustrated in FIG. 2, the queue 11d may exemplarily include the high priority queue 106 and the low priority queue 107.

The high priority queue 106 is a queue into which a sub-LUN ID that is to be preferentially read (output) by the migration instructor 11e is placed, and may include the predicted migration queue 106a and the high IO accessing queue 106b.

In the predicted migration queue 106a, a sub-LUN ID of a predicted migration target is placed. In the high IO accessing queue 106b, a sub-LUN ID having a high priority among the sub-LUNs of the Up targets is placed.

In the high priority queue 106, either the predicted migration queue 106a or the high IO accessing queue 106b may be given preference. In the present embodiment, all the sub-LUN IDs in the predicted migration queue 106a are output first and then all the sub-LUN IDs in the high IO accessing queue 106b are output. However, the preference is not limited to this.

Alternatively, all the sub-LUN IDs in the high IO accessing queue 106b may be output first and then all the sub-LUN IDs in the predicted migration queue 106a may be output. Further alternatively, the sub-LUN IDs may be output alternately from the predicted migration queue 106a and the high IO accessing queue 106b.

The low priority queue 107 is a queue that is given a lower priority than that of the high priority queue 106 and may include the miscellaneous queue 107a and the Down queue 107b. The sub-LUN IDs placed in the low priority queue 107 may be output after all the sub-LUN IDs in the high priority queue 106 are output (i.e., after the high priority queue 106 comes to be empty).

In the miscellaneous queue 107a, a sub-LUN ID having a lower priority among sub-LUN IDs of the Up targets is placed. In the Down queue 107b, a sub-LUN ID of the Down target is placed.

In the low priority queue 107, either the miscellaneous queue 107a or the Down queue 107b may be given preference. In the present embodiment, the sub-LUN IDs are output alternately from the miscellaneous queue 107a and the Down queue 107b, but the output manner is not limited to this. Alternatively, all the sub-LUN IDs in the miscellaneous queue 107a are output first and then the all the sub-LUN IDs in the Down queue 107b are output, but the sequence may be opposite.

In the example of FIG. 2, the queue 11d includes the four storing regions 106a, 106b, 107a, and 107b for the convenience, but is not limited to this. Alternatively, the queue 11d is one or more storing regions one or more memories each having an FIFO configuration which storing regions are segmented into four regions (ranges) one to which each of the four reference numbers 106a, 106b, 107a, and 107b are allocated. In this case, the position where a sub-LUN ID is stored in each of the four regions may be assigned by a pointer.

<<Description of Migration Instructor 11e>>

The migration instructor 11e sequentially reads the sub-LUN IDs accumulated in the queue 11d as many as the allowable range in each interval at predetermined time intervals (t), and instructs the tier driver 12 to perform tier migration on the data in the sub-LUN corresponding to the read sub-LUN ID.

For example, at the start of an interval, the migration instructor 11e may extract a single sub-LUN ID from the high priority queue 106 and instruct the tier driver 12 to migrate the data in the corresponding sub-LUN to the DIMM 30. The migration instructor 11e may subtract the time taken to execute the migration from the remaining time of the interval and may instruct the tier driver 12 to migrate the data corresponding to the sub-LUN IDs present at the high priority queue 106 until the remaining time comes to be zero or a sub-LUN ID does not exist in the high priority queue 106 any longer.

When no sub-LUN ID is present in the high priority queue 106, the migration instructor 11e may extract a single sub-LUN ID from the low priority queue 107 and instruct the tier driver 12 to migrate the data of the corresponding sub-LUN to the DIMM 30 or the SSD 20. The migration instructor 11e may subtract the time taken to execute the migration from the remaining time of the interval and may instruct the tier driver 12 to migrate the data corresponding to the sub-LUN IDs present at the low priority queue 107 until the remaining time comes to be zero or a sub-LUN ID does not exist in the low priority queue 107 any longer.

As the above, the migration instructor 11e is an example of an execution controller that reads a migration instruction stored in the queue 11a and controls the execution of a migration process in accordance with the migration instruction.

Figure 9:
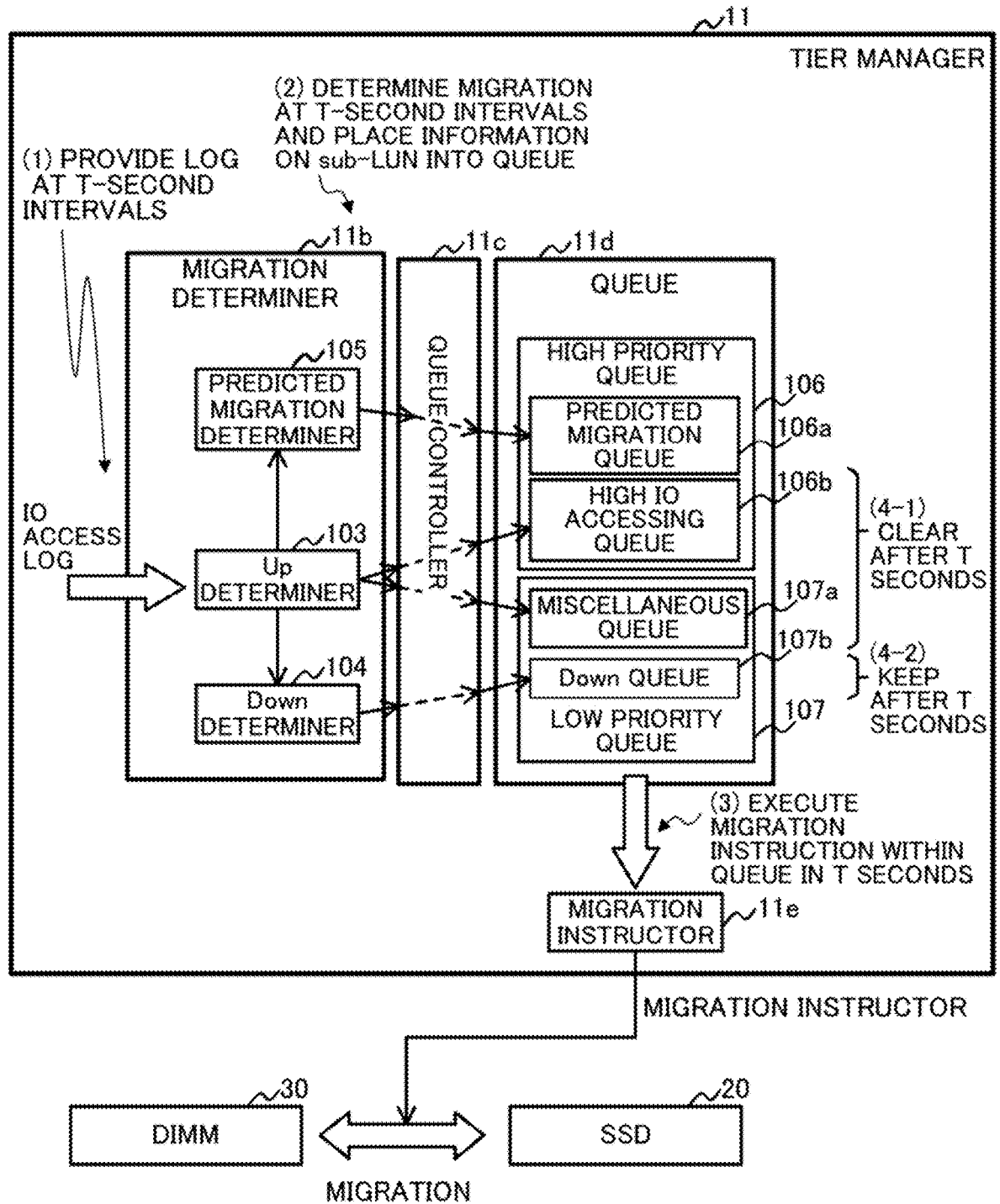
FIG. 9 is a diagram illustrating an example of operation of a tier manager according to the embodiment.

FIG. 9 is a diagram illustrating an example of operation performed by the tier manager 11. FIG. 9 omits illustration of partial configuration for convenience.

According to a method of the embodiment described above, the migration determiner 11b of the tier manager 11 is provided with an IO access log at predetermined time intervals (e.g., every T seconds) as exemplarily illustrated in FIG. 9 (see Arrow (1) in FIG. 9).

In the migration determiner 11b, migration determination is made in regular time intervals, and pushes information of the sub-LUN determined to be a migration target to the queue 11d by means of distribution by the queue controller 11c (see Arrow (2) in FIG. 9).

The information of sub-LUNs accumulated in the queue 11d is read as many as the number of being executable in a predetermined time period by the migration instructor 11e, and migration of the data in the corresponding sub-LUNs is instructed (see Arrow (3) of FIG. 9). In response to the instruction of the migration, the tier driver 12 (not illustrated in FIG. 9) and the migration processing unit 15 execute migration of the data in the sub-LUN between the SSD 20 and the DIMM 30.

When a predetermined time period elapses, the migration instructor 11e clears the data in the queues for the Up process (i.e., the predicted migration queue 106a, high IO accessing queue 106b, and the miscellaneous queue 107a)

(see Reference Number (4-1) in FIG. 9). In contrast, the migration instructor 11e holds the data of the queue for the Down process (i.e., the Down queue 107b) (see Reference Number (4-2) in FIG. 9).

In other words, the migration determiner 11b determines target data for a migration instruction from the SSD 20 to the DIMM 30, and the priority of the target data, and the queue controller 11c stores the migration instruction of the determined target data into the queue 11d according to the priority thereof. After that, the migration instructor 11e reads all the migration instructions having the high priority from the queue 11d and then reads the migration instructions of the low priority.

According to the queue controller 11c, the queue 11d, and the migration instructor 11e, sub-LUNs which would bring larger effect in improving the performance in the sub-LUN group of the Up targets can be preferentially arranged in the DIMM 30. The remaining sub-LUNs in the sub-LUN group of the Up targets can be arranged to the DIMM 30 or the SSD 20 along with the sub-LUN of the Down target fairly from the low priority queue 107.

Consequently, since the consumption amount of the DIMM 30 can be abated, keeping the performance of the tiered storage controller 10, data can be efficiently migrated between the tiers can be efficient.

Figure 10:
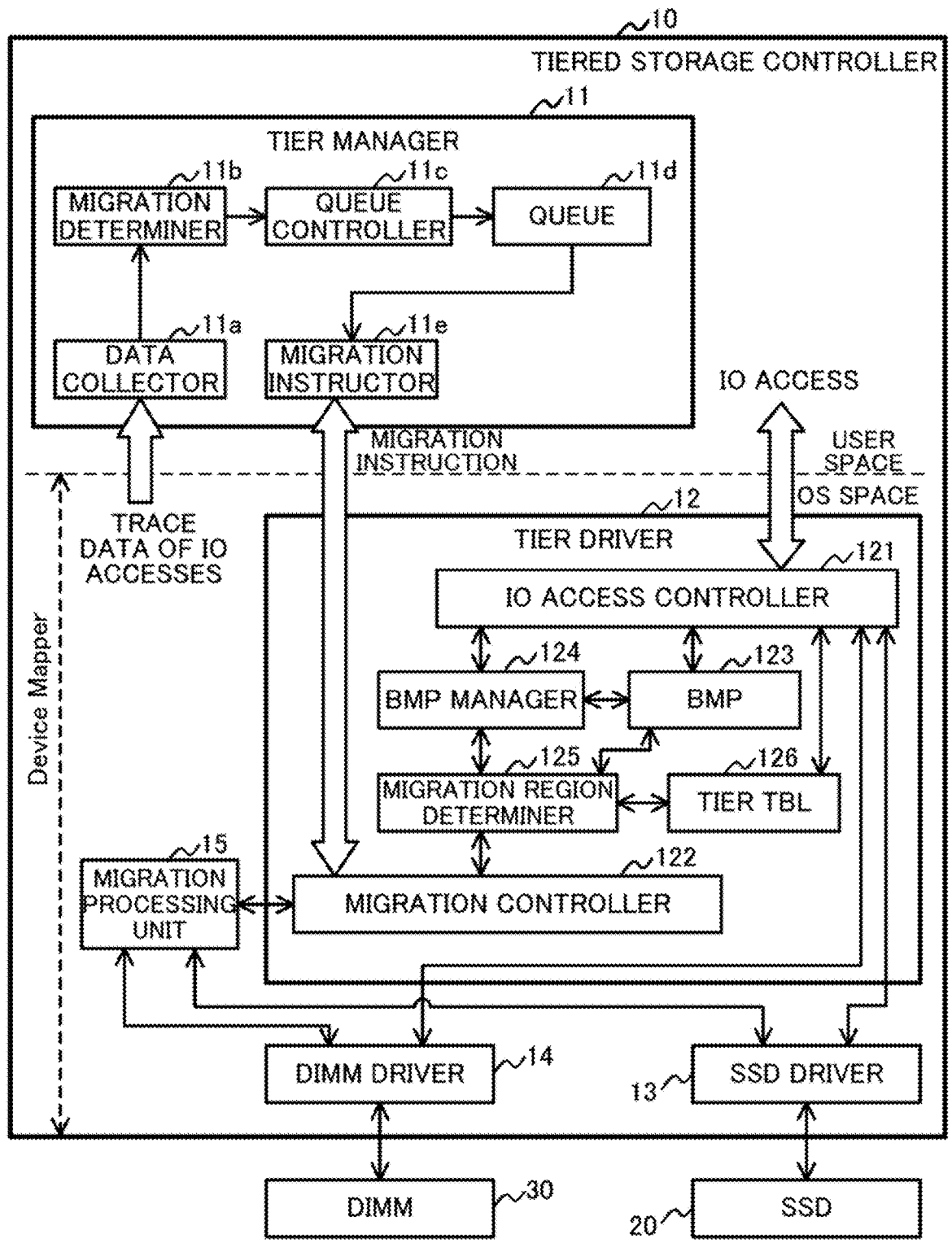
FIG. 10 is a block diagram illustrating an example of the configuration of a tier driver according to an example of the embodiment.

>>1-2-2> Description of Tier Driver:

FIG. 10 is a diagram illustrating an example of the functional configuration of the tier driver 12. For the convenience, FIG. 10 omits illustration that the components (see FIG. 2) of the migration determiner 11b and the queue 11d includes.

Here, the description of the first embodiment assumes that a data migration instruction (migration instruction) issued from the tier manager 11 using the configuration and the scheme described above, but the first embodiment is not limited to the following example.

For example, it is satisfactory that a migration instruction of migrating data in units of sub-LUN between the SSD 20 and the DIMM 30 is input into the tier driver 12. Alternatively, a migration instruction issued from a (e.g., conventional) tier manager different from the tier manager 11 described above with reference to FIGS. 2-9 may be input into the tier driver 12.

As illustrated in FIG. 10, the tier driver 12 may exemplarily include an IC access controller 121, a migration controller 122, a BMP 123, a BMP manager 124, a migration region determiner 125, and a tier TBL 126. Here, the word "BMP" is an abbreviation of "bitmap" and the word "TBL" is an abbreviation of "table".

The IO access controller 121 carries out various controls related to IO accesses with the user (host apparatus 2). For example, the IO access controller 121 distributes IO requests directed to the storage volume from the user to the SSD driver 13 or the DIMM driver 14 by referring to the tier TBL 126, and the IO access controller 121 replies to the user with an IO response from the SSD driver 13 or the DIMM driver 14.

The migration controller 122 carries out various controls related to a data migration process between the SSD 20 and the DIMM 30. In a data migration process, the migration controller 122 carries out tier migration in units of sub-LUNs by referring to the tier TBL 126 in response to an instruction from the migration instructor 11e. For example, upon receipt of a migration instruction (segment migration instruction) from the migration instructor 11e, the migration controller 122 executes the migration process that migrates data stored in a unit region of a migration target in the DIMM 30 or the SSD 20 to the SSD 20 or the DIMM 30.

According to a known manner, in cases where data writing into a sub-LUN of the Down target has been generated even only once during a migration process (Down process) from the DIMM 30 to the SSD 20, the migration controller 122 rewrites the entire region of the same sub-LUN into the SSD 20.

As described above, since each sub-LUN has a size of about 1 GB, in cases where the size of a region into which data writing occurred is relatively small, the load and the time for a process of rewriting the data in the entire region of the sub-LUN from the DIMM 30 to the SSD 20 increase and come to be inefficient.

As a solution to the above, by including the configurations of the BMP 123, the BMP manager 124, the migration region determiner 125, and the tier TBL 126 in the tier driver 12, the present embodiment can cause the migration controller 122 to efficiently execute a Down process.

The BMP 123 is information to manage a region (partial region) to which a writing IO access is generated in a sub-LUN being arranged in the DIMM 30 and having a first size, and may be stored in, for example, a storing region such as a non-illustrated memory. The storing region that stores the BMP 123 may be referred to as a first memory.

In other words, the BMP 123 is an example of management information managing whether a writing access occurs on a region storing the target data for the migration process on the DIMM 30 and having the first size, for each partial region obtained by dividing the storing region storing the target data by a given value to have a second size.

For example, the BMP 123 may have bits each associated with one of the partial regions, which is obtained by dividing the storing region of a sub-LUN into a predetermined number M segments (M is an integer of 2 or more, e.g., M=100). A partial region is a storing region obtained by dividing a sub-LUN and therefore may be represented by a "sub-sub-LUN".

The BMP manager 124 manages the BMP 123. For example, the BMP manager 124 sets a bit on the BMP 123 which bit is associated with a partial region of a sub-LUN which is updated by a writing IO access to be "ON".

The migration region determiner 125 counts the bit number of bits set to be "ON" in relation to a sub-LUN of the Down target in the bitmap 123 with reference to the tier TBL 126 and the bitmap 123. Then the migration region determiner 125 determines either one of a partial region having an "ON" bit or the entire region of the sub-LUN to be a migration region of the Down target.

Figure 11:
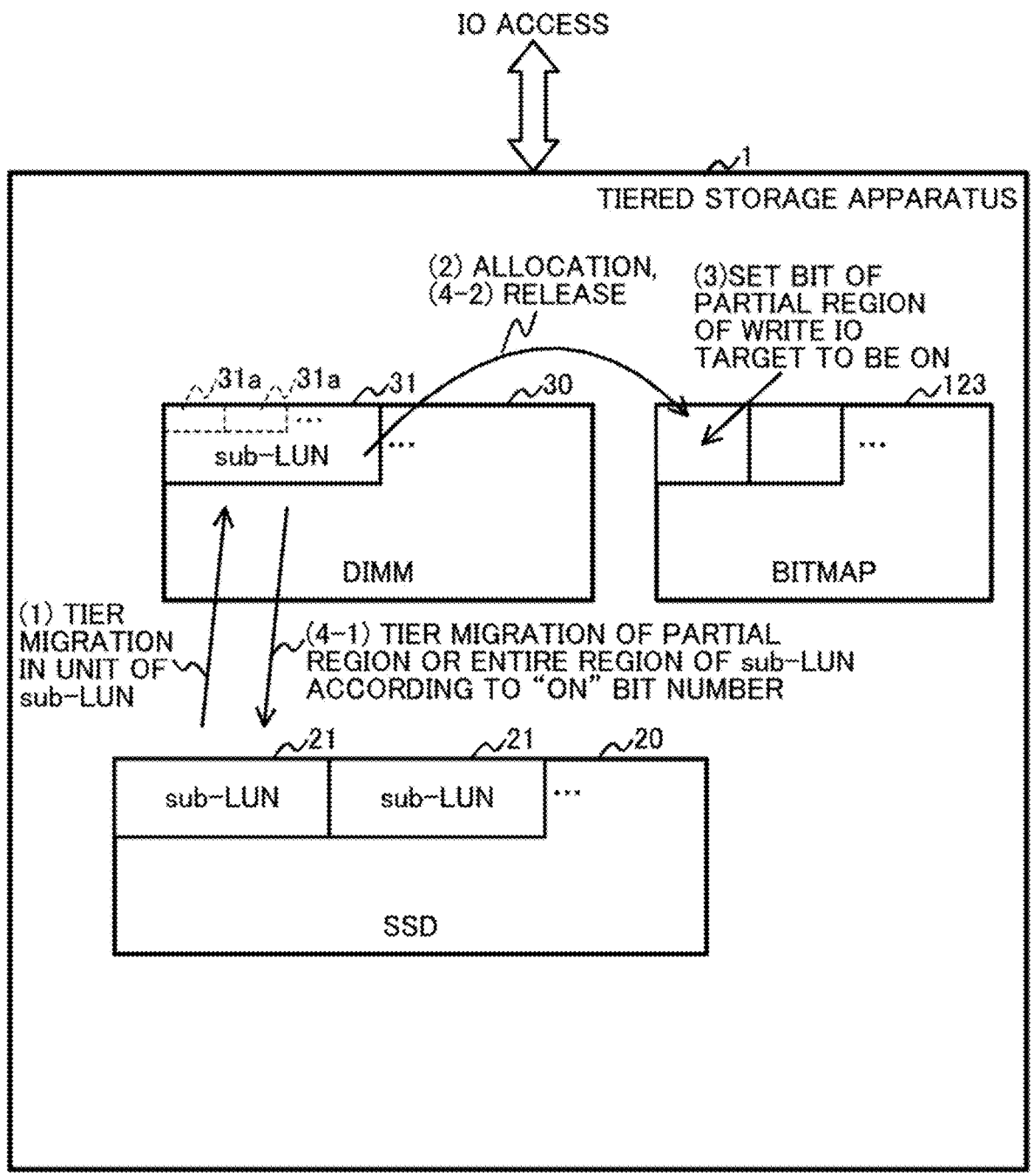
FIG. 11 is a diagram illustrating an example of operation of a tier driver according to the embodiment.

FIG. 11 is a diagram illustrating an example of operation of the tier driver 12. For convenience, FIG. 11 omits illustration of part of the configuration for convenience.

As exemplarily illustrated in FIG. 11, data in the SSD 20 undergoes migration (UP process) to the DIMM 30 in units of sub-LUN in the tier driver 12 (see Arrow (1) in FIG. 11).

In cases where the data of a sub-LUN 21 in the SSD 20 is arranged (migrated) to the DIMM 30, the BMP manager 124 allocates a storing region in the BMP 123 to a sub-LUN 31 arranged in the DIMM 30 (see Arrow (2) in FIG. 11).

In cases where a writing IO access occurs for the DIMM 30, the BMP manager 124 sets the bit in the BMP 123 which bit is associated with a partial region 31a for which the writing IO access occurs and which region is included in the sub-LUN 31 to be "ON" (see Arrow (3) in FIG. 11).

In cases where the sub-LUN 31 is to be migrated (Down process) to the SSD 20, the migration region determiner 125 counts the bit number of bits set to be "ON" among the multiple bits allocated to the sub-LUN 31 of the Down target with reference to the BMP 123.

In cases where the count value is equal to or less than a given value (N; N is a natural number), the migration region determiner 125 determines one or more partial regions 31a of the sub-LUN 31 which regions are associated with bits set to be "ON" in the BMP 123 to be the migration regions of the Down target.

In contrast to the above, in cases where the count value is more than the predetermined value (N), the migration region determiner 125 determines the entire region of the sub-LUN 21 of the Down target to be the migration region of the Down target.

Then the migration region determiner 125 instructs the migration controller 122 to execute the Down process on the determined migration region of the Down target.

The migration controller 122 executes the Down process (Evict) on the migration region (one or more partial regions 31a or the entire region of the sub-LUN 31) instructed by the migration region determiner 125 for the sub-LUN 31 of the Down target (see Arrow (4-1) in FIG. 11). In the Down process, the migration controller 122 may transmit, to the migration processing unit 15, a forwarding instruction to forward data in the migration region instructed by the migration region determiner 125 from the DIMM 30 to the SSD 20. When the migration processing unit 15 completes the forwarding of the data in the migration region and the migration controller 122 receives completion notification from the migration processing unit 15, the migration controller 122 may release the sub-LUN 31 on which the Down process has been executed from the DIMM 30.

Here, the migration region determiner 125 may notify the BMP manager 124 of the information of the sub-LUN 31 on which the Down process has been executed. The BMP manager 124 clears (releases) allocation of the sub-LUN 31 notified by the migration region determiner 125 to the BMP 123 (see Arrow (4-2) in FIG. 11). Here, the storing region of the BMP 123 to which the allocation is cleared is managed to be allocatable to a sub-LUN 31 on which the UP process has been executed by the BMP manager 124.

According to the method of the present embodiment, as the above, the migration region determiner 125 determines the presence or the absence of data writing into a partial region 31a of the sub-LUN 31 arranged in the DIMM 30 by referring to the BMP 123. As a result of the determination, in cases where the number of partial regions 31a subjected to writing in the sub-LUN 31 of the Down target is equal to or smaller than a given number N, the migration region of the Down process is limited to the partial regions 31a subjected to writing, not the entire region of the sub-LUN 31.

In other words, in cases where the number of accessed partial regions to which writing accesses are made in relation to the target data of the migration instruction is equal to or less than the threshold N with reference to the BMP 123, the migration region determiner 125 migrates the accessed partial regions 31a to which the writing accesses are made among the target data from the DIMM 30 to the SSD 20.

This makes it possible to efficiently carry out the Down process in accordance with the range of a region modified by an IO access.

As the above, the migration controller 122, the migration region determiner 125, and the migration processing unit 15 are an example of a migration executor that carries out the following processes (i) to (iii).

(i) In response to an execution instruction to migrate target data of the first size from the DIMM 30 to the SSD 20, the migration executor determines, by referring to the BMP 123, whether the number of accessed partial regions 31a to which the writing accesses are made in the sub-LUN of the target data is equal to or smaller than the threshold N.

(ii) In cases where the number of accessed partial regions 31a to which the writing accesses are made is larger than the threshold N, the migration executor migrates the target data from the DIMM 30 to the SSD 20 in units of the first size.

(iii) In cases where the number of accessed partial regions 31a to which the writing accesses are made is equal to or less than the threshold N, the migration executor migrates data in the accessed partial regions 31a to which the writing accesses are made among the target data from the DIMM 30 to the SSD 20 in units of second size.

The tier TBL 126 is a table used for distribution of IO accesses by the IO access controller 121 and tier control by, for example, the migration controller 122 or the migration region determiner 125, and may be achieved by, for example, a non-illustrated memory.

FIG. 12 is a diagram illustrating an example of the tier TBL 126. As illustrated in FIG. 12, the tier TBL 126 is capable of storing a DIMM offset and an SSD offset, and the status of each segment whose data has been migrated to the DIMM 30 in association with one another. The tier TBL 126 of FIG. 12 is illustrated in a table form, but the form of the tier TBL 126 is not limited to this. Alternatively, the tier TBL 126 may be in various forms exemplified by a sequence or a database stored in, for example, a memory.

A DIMM offset represents an offset of a segment whose data has been migrated to the DIMM 30 in the DIMM 30. A DIMM offset may be a fixed value having a unit of an offset "2097152" corresponding to the segment size (e.g., 1 GB) on the volume. Examples of a DIMM offset are "0", "2097152", "4194304", "6291456", . . . .

An SSD offset represents an offset of a segment whose data has been migrated to the DIMM 30 in the SSD 20. The SSD offset value "NULL" represents that a region of the DIMM 30 assigned by a DIMM offset is not used.

A status represents a status of a segment, and may include "allocated", "Moving (SSD-DIMM)", "Moving (DIMM-SSD)", or free". The status "allocated" represents that the segment is allocated to the DIMM 30; the status "Moving (SSD-DIMM)" represents that the data of the segment is being forwarded from the SSD 20 to the DIMM 30 (during Up process); the status "Moving (DIMM-SSD)" represents that the data of the segment is being forwarded from the DIMM 30 to the SSD 20 (during Down process); and the status "free" represents the region of the DIMM 30 assigned by the DIMM offset is not used.

The IO access controller 121 can determine, by referring to the above-described tier TBL 126, whether an IC access is distributed to the SSD driver 13 or the DIMM driver 14. In addition, the IO access controller 121 can determine, by referring to the above tier TBL 126, whether the IO access is moving a segment.

(Detailed Description of the Tier Driver 12)

In the above example, the threshold N to determine a migration region across the tiers is assumed to be set to an appropriate (proper) value on the basis of prior-estimation, for example.

However, the appropriate N value may vary depending on the device configuration used in the tiered storage apparatus 1 and/or operation workload. In the above example, it is difficult to change the value N during the operation.

As a solution to the above, the tier driver 12 of the present embodiment may calculate an appropriate (e.g., optimum) value N while the tiered storage apparatus 1 is operating and apply the calculated value N.

Here, assuming that the size of a sub-LUN 31 is 3 and the size of a partial region 31a is s, the relationship of the following Expression (1) is satisfied. Far example, when the size S is 1 GB, the size s is about 1 MB.

$$S \gg s \quad (1)$$

Figure 13:
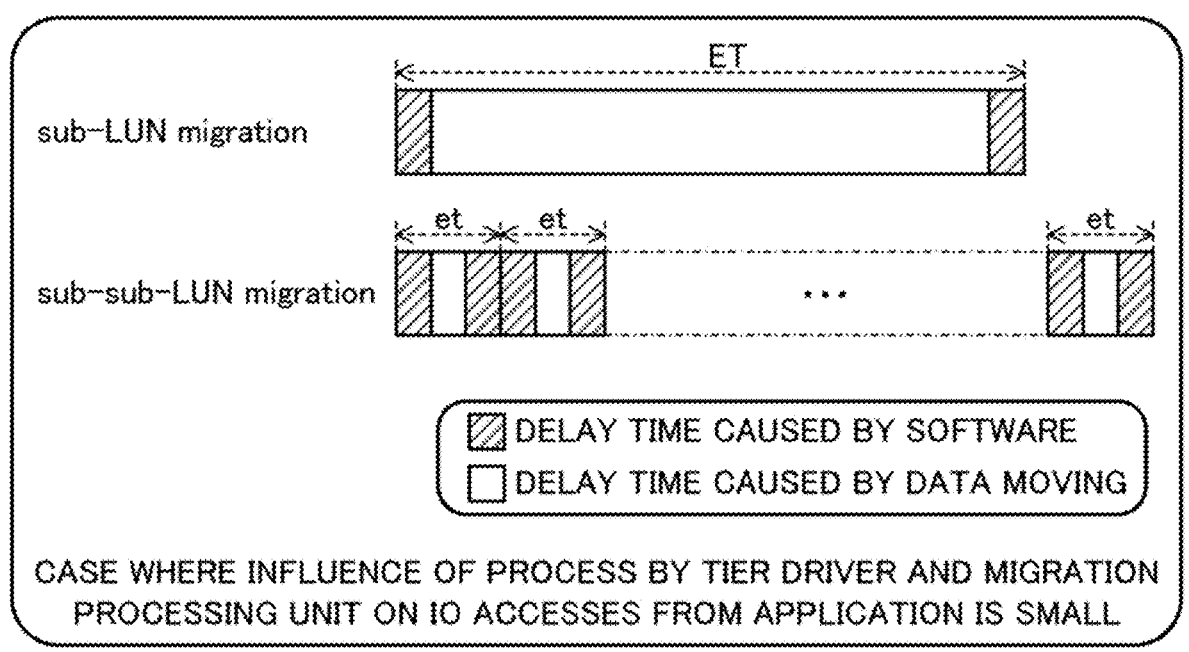
FIG. 13 is a diagram exemplarily illustrating the breakdown of a process time.

FIG. 13 is a diagram illustrating examples of the contents of a processing time ET of a Down process (replacement process) performed on the overall sub-LUN 31 and a processing time et of an Down process (replacement process) performed on one or more partial regions 31a. The example of FIG. 13 assumes influence of an IO access made from the application on the process performed by the tier driver 12 and the migration processing unit 15 is small.

As illustrated in the example of FIG. 13, the process times ET and et each include delay time caused by SW (software) (see hatched areas), and delay time caused by data moving (see white areas).

The delay time caused by data moving is a delay time that changes with the data size of a migration region (i.e., whether the data is an overall sub-LUN 31 or a partial region 31a). In contrast, the delay time caused by SW is a delay time that is caused by internal process by the migration processing unit 15 such as kcopyd, and is therefore constant or substantially constant irrespective of the data size of a migration region (in other words, both in the process time ET and the process time et).

Accordingly, the delay time caused SW (overhead) increases in proportional to the number of the partial regions 31a of a migration region of a single sub-LUN 31. As denoted by the following Expression (2), the process times ET and et when an overall single sub-LUN 31 at once is forwarded shorter than the processing times ET and et when all the partial regions 31a of the single sub-LUN 31 is forwarded, which means the former process can be rapidly performed). In the following Expression (2), the symbol "M" represents the number into which a sub-LUN 31 is divided.

$$ET < et*M \quad (2)$$

Considering the above, the migration controller 122 obtains a threshold N (where, N is an integer less than M) that satisfies the state represented by the following Expression (3) during the operation and appropriately update the value N.

$$ET = et*N(N<M) \quad (3)$$

As described above, the first embodiment assumes that a sub-LUN 31 is replaced from the DIMM 30 to the SSD 20 during the operation of the tiered storage apparatus 1.

Figure 14:
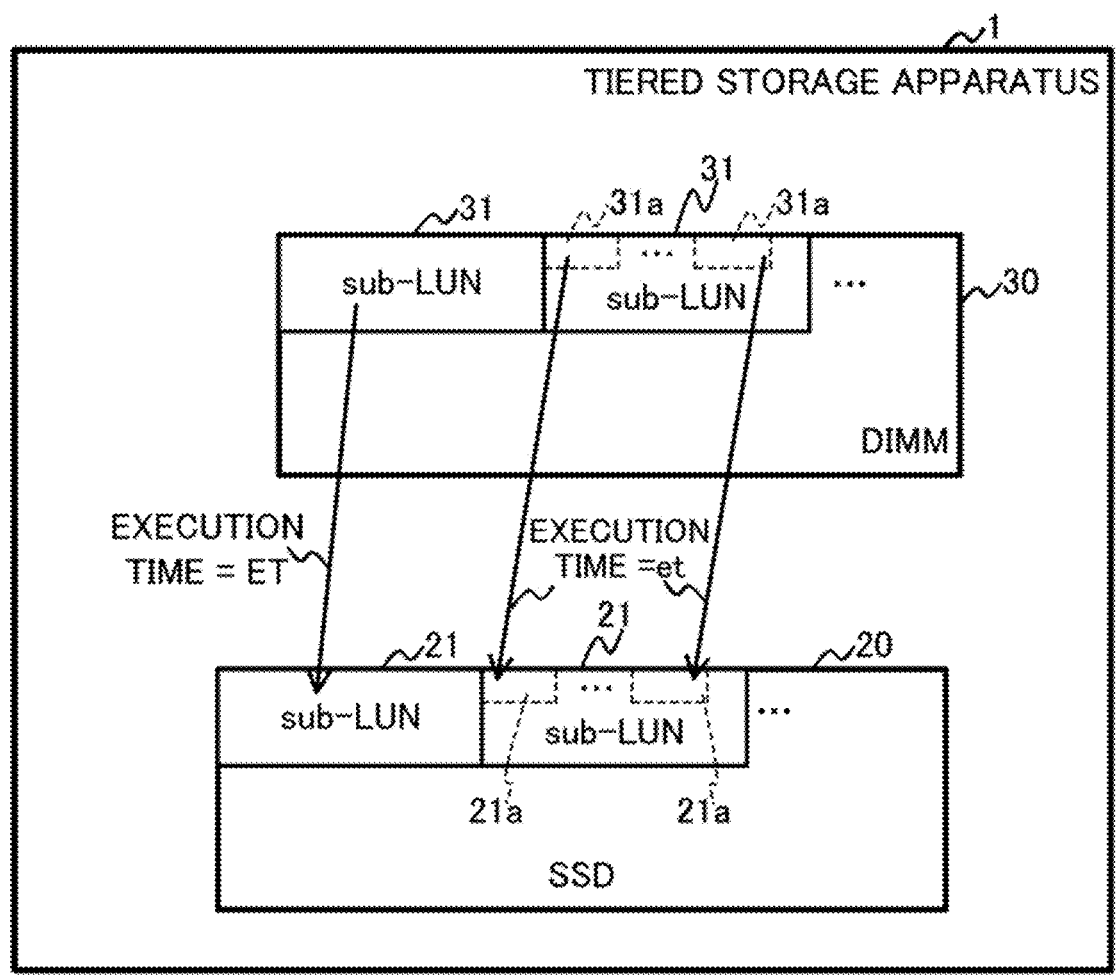
FIG. 14 is a diagram illustrating an example of change in a process time for migrating a sub-LUN and in a process time for migrating a partial region.

For this reason, as illustrated in FIG. 14, the process time ET for migrating data in the sub-LUN 31 to a sub-LUN 21 and the process time et for migrating data in a partial region 31a to a partial region 21a may be varied due to an influence of an IO access pattern on the tier driver 12. This means that an effective N value is changed with a change in access pattern.

Figure 15:
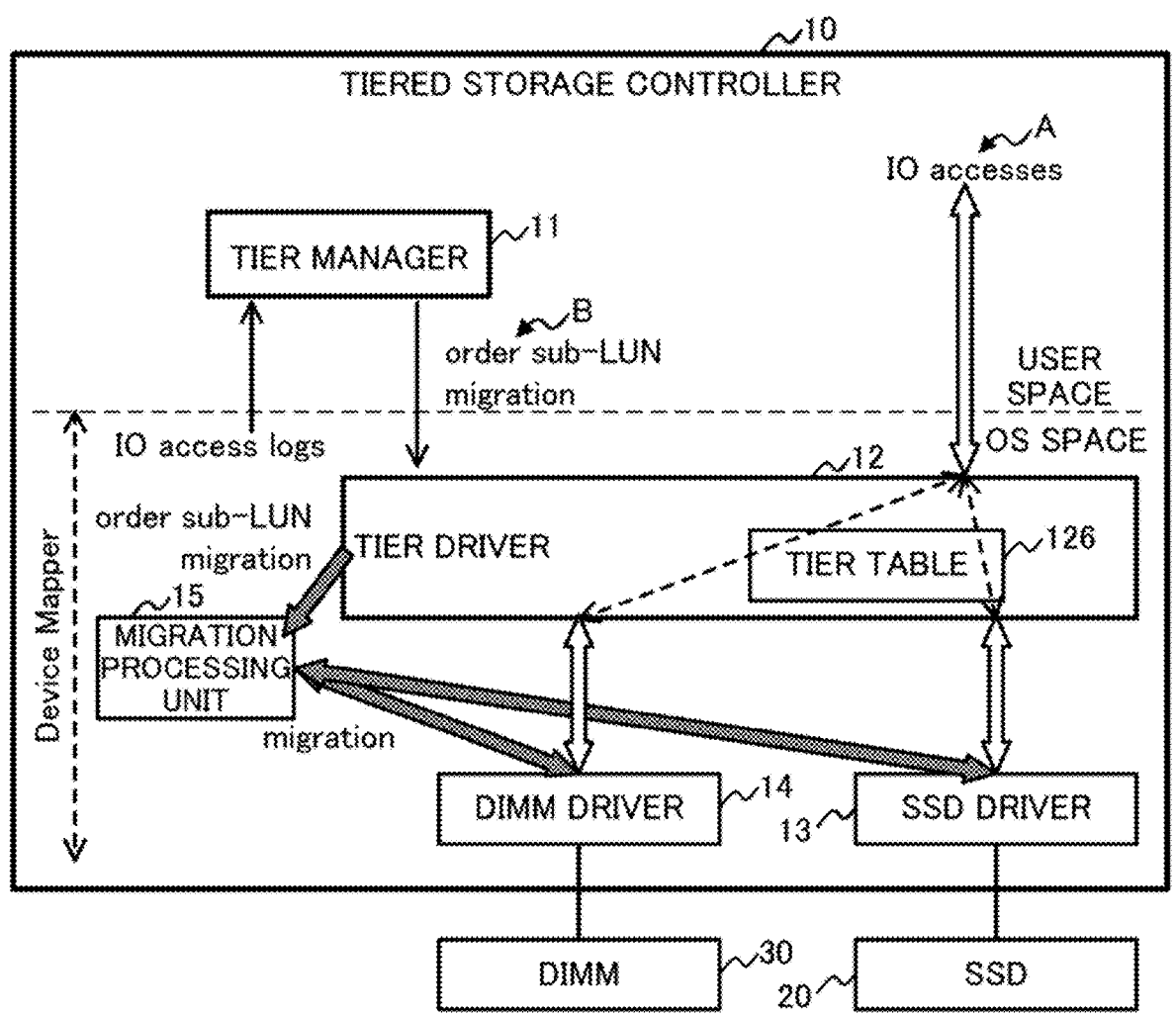
FIG. 15 is a diagram illustrating an example of a factor in changing a process time.

FIG. 15 is a diagram illustrating an example of a factor in changing the process times ET and et. Hereinafter, description will now be made in relation to a factor in changing the processing times ET and et with reference to FIG. 15.

(First Factor)

As illustrated in FIG. 15, an IO access (see white arrows indicated by a reference symbol A and broken arrows) and a migration process (see solid arrows indicated by a reference symbol B and half-tone arrows) are sometimes performed on a same device (SSD 20 or DIMM 30) in parallel with each other.

For the above, since the processing load on the SSD driver 13 and/or the DIMM driver 14 increases or decreases in response to increase or decrease of IO accesses from the application, the IO access time in a migration process varies.

Figure 16:
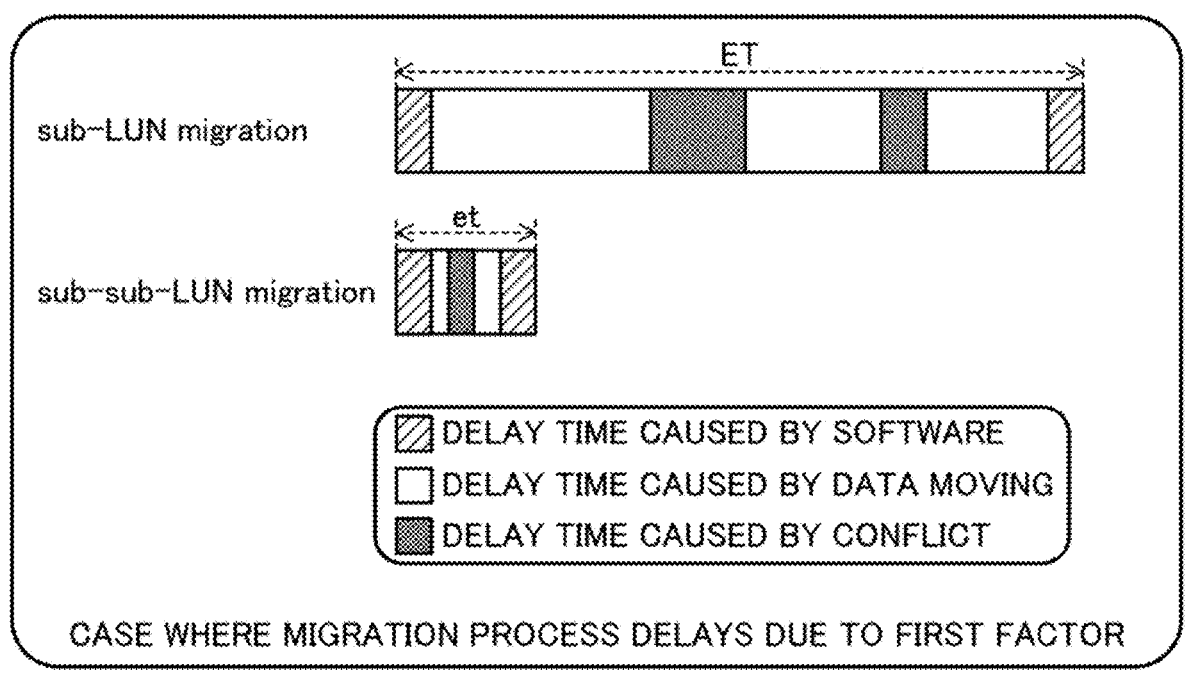
FIG. 16 is a diagram illustrating an example of a delay time caused by a first factor in a migration process.

FIG. 16 is a diagram illustrating an example of a delay time in a migration process due to the first factor. As illustrated in FIG. 16, the process times ET and et are delayed by conflict of data forwarding in the migration process with IO accesses from the application. As illustrated in FIG. 16, the delay caused by the first factor more affects the process time ET, which has a longer time for forwarding data than the process time et, than the process time et.

(Second Factor)

In cases where processing load on the processor rises inside the tiered storage controller 10, there is a high possibility of delaying task scheduling in the OS (e.g., Kernel). A module (e.g., Kernel driver) of, for example, the migration processing unit 15 (e.g., kcopyd) frequently undergo interruptions therein, and therefore delaying calling of such interruptions increases the IO access time.

Here, the IO accesses have various patterns exemplified by a sequential access, a random access, and a mixed accesses containing a sequential access and a random access to the SSD 20 or the DIMM 30. The tendencies of deviation of processing loads on the SSD driver 13, the DIMM driver 14, and the migration processing unit 15 are different with such access patterns.

Figure 17:
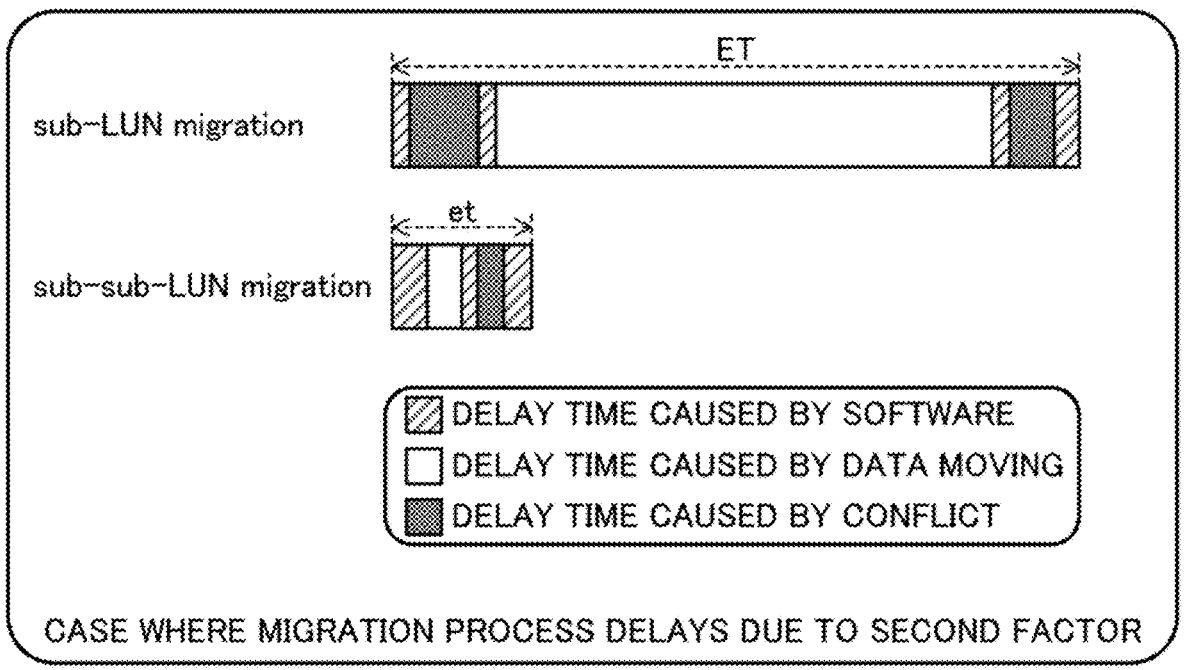
FIG. 17 is a diagram illustrating an example of a delay time caused by a second factor in a migration process.

FIG. 17 is a diagram illustrating an example of a delay time in a migration process due to the second factor. As illustrated in FIG. 17, the values of the process times ET and et delay by influence caused by delaying in interruption scheduling of the Kernel driver such as kcopyd. As illustrated in FIG. 17, an amount of increase (delay) in the IO access time caused by the second factor depends on, for example, the extent of the processing load on the processor, the implementation of the OS, and a timing, and is not univocally determined. This makes it difficult to estimate the delay time of IO accesses.

As a solution to the above, the tier driver 12 of the present embodiment effectively calculates and updates the value N in the following manner, for example. The initial value N is appropriately (properly) set by, for example, prior-estimation in advance.

Figure 18:
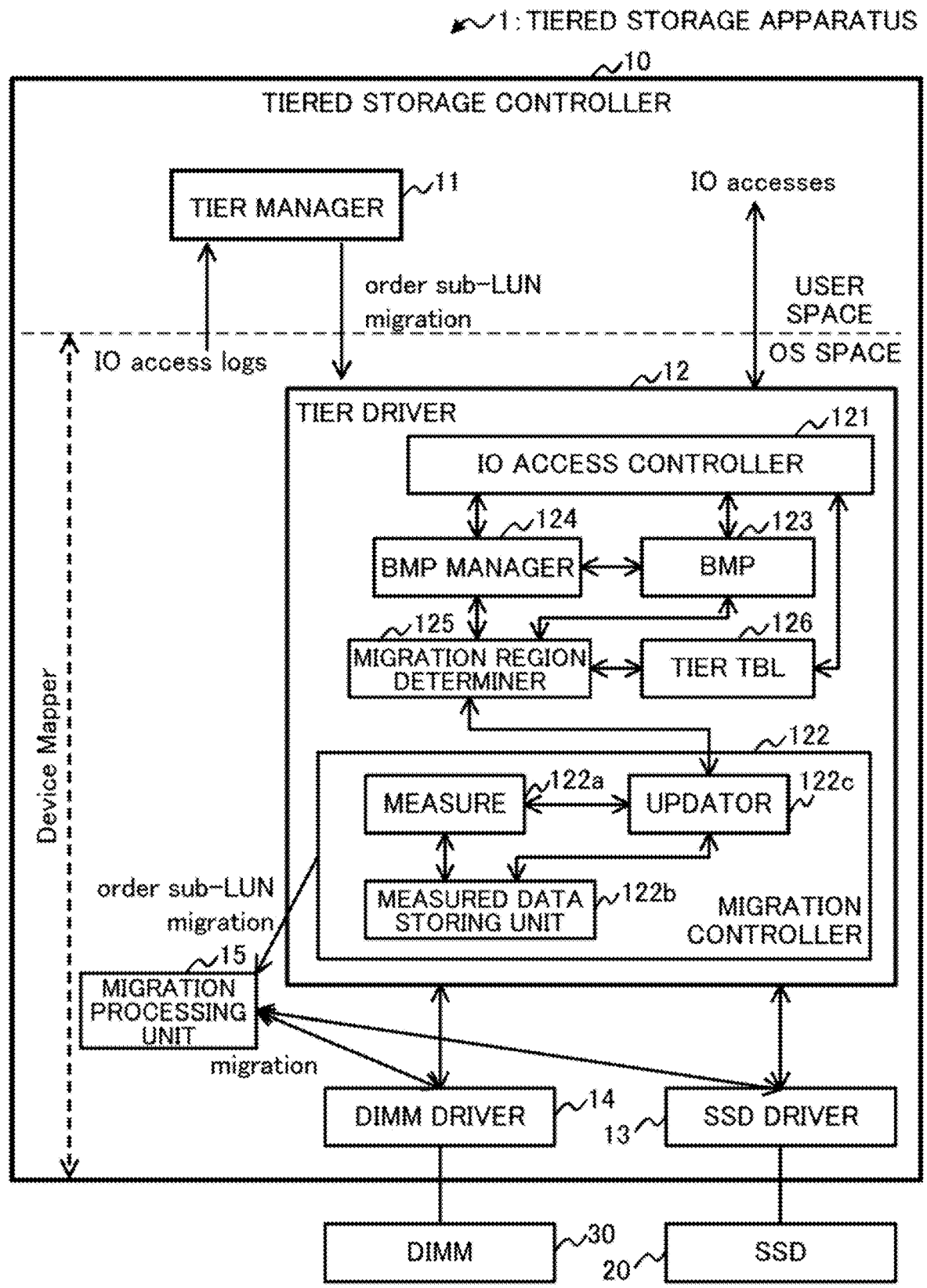
FIG. 18 is a block diagram schematically illustrating an example of operation performed by a migration controller in a tier driver of the embodiment.

FIG. 18 is a block diagram illustrating an example of operation of the migration controller 122 in the tier driver 12 of the present embodiment. As illustrated in FIG. 18, the migration controller 122 may exemplarily include a measure 122a, a measured data storing unit 122b, and an updater 122c.

The measure 122a measures, when a Down process is performed on a migration region (i.e., one or more partial regions 31a or an overall region of a sub-LUN 31) from the DIMM 30 to the SSD 20, a time that the Down process takes and stores the measured data into the measured data storing unit 122b. As an example, the measure 122a may measure, as the measured data, a time period from transmission of a forwarding instruction to the migration processing unit 15 to reception of completion notification from the migration processing unit 15.

The measured data storing unit 222b is an example of a second memory that stores a result of calculation by the measure 122a, and may store measured data illustrated in FIG. 19, for example.

FIG. 19 is a diagram illustrating an example of measured data stored in the measured data storing unit 122b. As illustrated in FIG. 19, the measured data scoring unit 122b accumulates the processing time ET [ms] for tier migration of a sub-LUN 31 and accumulates the processing time et [ms] of a partial region 31a. In the example of FIG. 19, the measured data takes a table form, but is not limited to the table form. Alternatively, the measured data may be stored in a memory, for example, in various forms such as a sequence and a DB.

In cases where a migration region for which the process time has been measured is a sub-LUN 31, the measure 122a may store the process time ET [ms], as the measured data, into the measured data storing unit 122b. In cases where a migration region for which the process time has been measured is one or more partial regions 31a, the treasure 122a may store the process time et [ms], as the measured data, into the measured data storing unit 122b.

As illustrated in FIG. 19, the measured data storing unit 122b may store a time stamp of the measured data. A time stamp may be information representing the start or end time of the measurement or a time when the measured data is stored, for example.

The measured data storing unit 122b may store the process time ET [ms] and the process time et [ms] into different tables, different sequences, or different DBs.

As described above, the measure 122a is an example of a calculating unit that calculates a first migration time period that migration from the DIMM 30 to the SSD 20 in a unit of the first size takes and a second migration time period from the DIMM 30 to the SSD 20 in a unit of the second size takes.

In cases where pieces of the measured data stored in the measured data storing unit 122b reaches a given number, the updater 122c changes the value N based on the measured data.

For example, the updater 122c monitors the measure 122a or the measured data storing unit 122b and when one or both of a case where the number of pieces of the measured data of the processing time ET reaches ETn and a case where the number of pieces of the measured data of the processing time et reaches etn are satisfied, may calculate the value N. Here, the values ETn and etn may be the same value and different values.

For example, the updater 122c may calculate the average values ETave and etave of the ET and the et using the following Expressions 4) and (5), respectively. The values ET1, ET2, . . . , ETn in Expression (4) represent measured data of the process time ET; and the values et1, et2, . . . , etn in Expression (5) represent measured data of the process time et. The average function outputs an average value of the measured data of the processing time ET or an average value of the measured data of the processing time et.

$$ETave=\text{average}(ET1, ET2, \ldots, ETn) \quad (4)$$

$$etave=\text{average}(et1, et2, \ldots, etn) \quad (5)$$

Then the updater 122c may calculate the value N based on the result of calculation of Expressions (4) and (5), using the following Expression (6). The int function outputs the minimum integer exceeding ETave/etave, that is the integer obtained by rounding up after the decimal point of the result of calculating ETave/etave.

$$N=\text{int}(ETave/etave)-1 \quad (6)$$

As denoted by above Expressions (4) to (6), it can be said that the threshold N is changed on the basis of the result of dividing the average values of the results of calculating the migration time period of data migrated in units of the first size by the average value of the results of calculating the migration time period of data migrated in units of the second size.

Alternatively, the updater 322c may calculate the value N using the data measured by the measured data storing unit 122b within a latest given time period, not calculating the value N when the number of pieces of the measured data reaches ETn and etn. The updater 122c may calculate weighed average that gives a larger weight to a more recent measured data in the above Expressions (4) and (5).

After that the updater 122c may update the value N used by the migration region determiner 125 by notifying the calculated value N of the migration region determiner 125.

Upon calculation or updating of the value N, the updater 122c may clear, e.g., delete or invalidate, the measured data stored (accumulated) in the measured data storing unit 122b.

As described above, the updater 122c is an example of a changing unit that changes the threshold N based on the result of calculation by the measure 122a.

The migration controller 122 (e.g., periodically) repeats execution the above process performed by the measure 122a or the updater 122c while the tiered storage apparatus 1 is operating and thereby can effectively calculate and update the value N.

Since the measured data stored in the measured data storing unit 122b is deleted or invalidated at each cycle of calculating and updating of the value N, the delay time the latest measured can be reflected in the calculation of the N value. This makes it possible to flexibly calculate the value N, following an IO access pattern having temporal locality and spatial locality.

Figure 20:
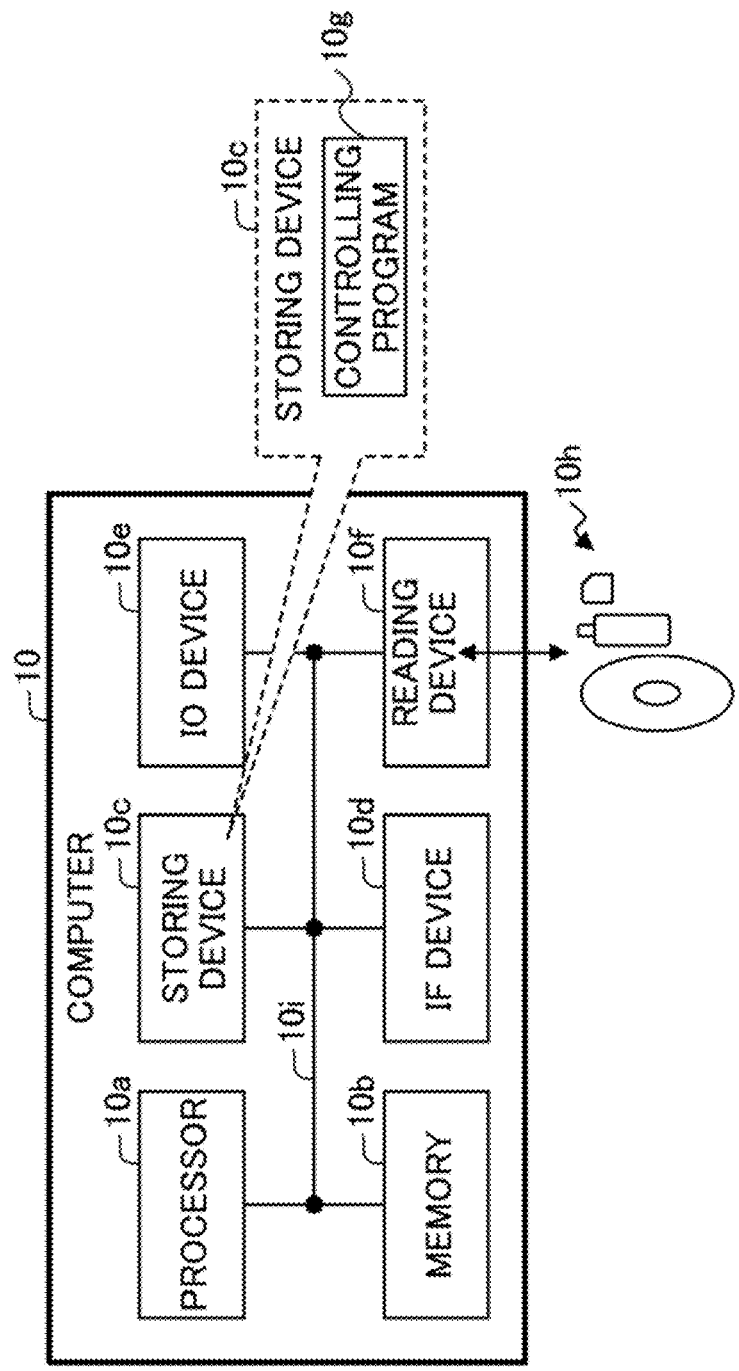
FIG. 20 is a diagram illustrating an example of the hardware configuration of a tired storage apparatus of FIGS. 2 and 10.

<<1-3>> Example of Hardware Configuration of Tiered Storage Controller:

Next, description will new be made in relation to the hardware configuration of the tiered storage controller 10 of FIGS. 2 and 10 by referring to FIG. 20. FIG. 20 is a diagram illustrating an example of the hardware configuration of the tiered storage controller 10 included in the tiered storage apparatus 1 according to an example of the embodiment.

As illustrated in FIG. 20, the tiered storage controller 10 may include a processor 10a, a memory 10b, a storing device 10c, an Interfacing (IF) device 10d, an IO device 10e, and a reading device 10f.

The processor 10a is an example of a calculation processing apparatus that is bidirectionally-communicably connected to the blocks 10b-10f via a bus 10i and that executes various controls and calculations. The processor 10a achieves various functions of the tiered storage controller 10 by executing one or more programs stored in the memory 10b, the storing device 10c, a recording medium 10h, or a non-illustrated Read Only Memory (ROM).

Here, the processor 10a may be a multi-processor including multiple processors, a multi-core processor having multiple processor cores, or a configuration including multiple multi-core processors.

Examples of the processor 10a is an Integrated Circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA).

The memory 10b is a device that stores various data and programs. In executing a program, the processor 10a stores and expands data and the program on the memory 10b. An example of the memory 10b is a volatile memory such as Random Access Memory (RAM).

The storing device 10c is a hardware device that stores various data and programs. Examples of the storing device 10c are storing devices exemplified by a magnetic disk apparatus ouch as a Hard Disk Drive (HDD), a semiconductor drive apparatus such as an SSD, and a non-volatile memory such as a flash memory. The storing device 10c may be an aggregation of multiple devices, which may constitute Redundant Arrays of Inexpensive Disks (RAID). Alternatively, the storing device 10c may be a Storage Class Memory (SCM) or may include the SSD 20 and the DIMM 30 illustrated in FIGS. 2 and 10.

The storing device 10c may store an information processing program 10g that achieves all or part of the functions of the tiered storage controller 10 of the embodiment. For example, the processor 10a can expand and execute the information processing program 10g read from the storing device 10c on the storing device ouch as the memory 10b. Thereby, the computer (including the processor 10a, the information processing apparatus, and various terminals) can achieve the above-described functions of the tiered storage controller 10.

The DB 101 exemplarily illustrated in FIG. 2, the BMP 123 and the tier TBL 126 exemplarily illustrated in FIG. 10, the measured data storing unit 122b exemplarily illustrated in FIG. 18 may be achieved by the storing regions of at least one of the memory 10b and the storing device 10c independently from each other.

The IF device 10a controls wired or wireless connection and communication of the tiered storage controller 10 with a network (not illustrated) or another information processing apparatus. Examples of the IF device 10d are adaptors confirming to a Local Area Network (LAN), a Fiber Channel (FC), or InfiniBand.

The IO device 10e may include one or the both of an input device such as a mouse or a keyboard, and an output device such as a monitor or a printer. For example, the IO device 10e is used for various operations made by the user or the manager of the tiered storage controller 10.

The reading device 10f is a reader that reads data and programs recorded in a computer-readable recording medium 10h. In the recording medium 10h, the information processing program 10g may be stored. For example, the processor 10a may expand and execute the program read from the recording medium 10h via the reading device 10f on the storing device such as the memory 10b.

An example of the recording medium 10h is a non-transitory recording medium such as a magnetic/optical disk or a flash memory. Example of a magnetic/optical disk are a flexible disk, a Compact Disc (CD), a Digital Versatile Disc (DVD), a Blu-ray disk, and a Holographic Versatile Disc (HVD). Examples of a flash memory is a USB memory and an SD card. Examples of a CD are CD-ROM, CD-R, and CD-RW. Examples of a DVD are DVD-ROM, DVD-RAM, DVD-R, DVD-RW, DVD+R, and DVD+RW.

The above hardware configuration of the tiered storage controller 10 is an example. The hardware elements in the tiered storage controller 10 may be increased or decreased (addition or deletion of an arbitrary element), divided, or integrated in an arbitrary combination. A path may be added or deleted appropriately.

<<2>> Example of Operation:

Next, description will now be made in relation to examples of the operation performed by the tiered storage apparatus 1 having the above configuration according to the embodiment with reference to FIGS. 21-27.

Figure 21:
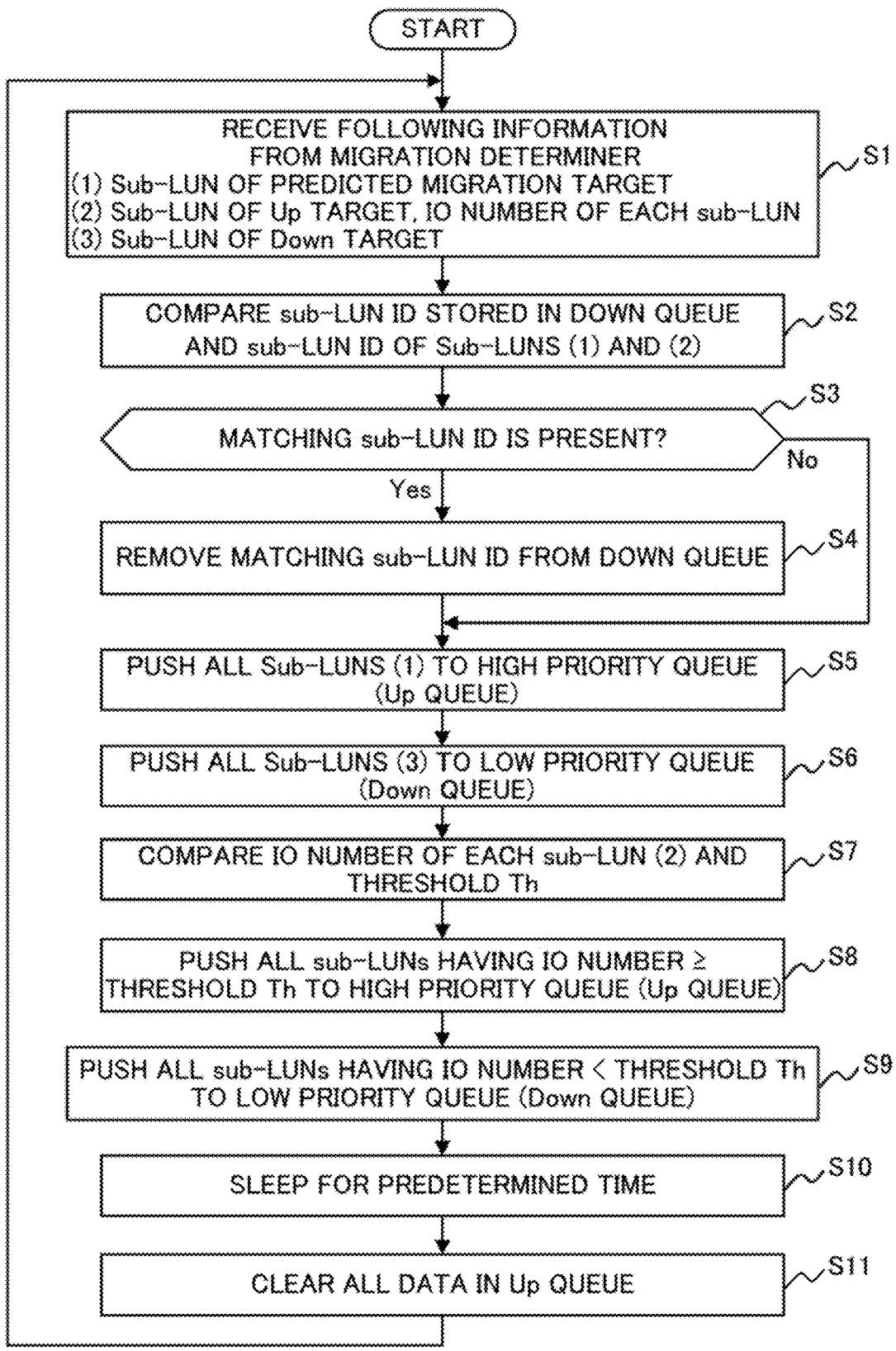
FIG. 21 is a flow diagram illustrating an example of operation of a process performed by a queue controller.

<<2-1>> Example of Operation of Queue Controller:

As illustrated in FIG. 21, the queue controller 11c receives the following information from the migration determiner 11b (Step S1).

(1) Sub-LUNs of a predicted migration target;
(2) Sub-LUNs of Up targets and the number of IO accesses to each sub-LUN; and
(3) sub-LUNs of Down targets The queue controller 11c compares the sub-LUN IDs determined at the intervals (i.e., the first timing) of the above (1) and (2) with the sub-LUN IDs already registered in the low priority queue 107 (the Down queue 107b) and determined at the past intervals (i.e., the second timing) (Step S2). As a result of the comparison, the queue controller 11c determines whether a matching sub-LUN ID is present (Step S3).

In cases where a matching sub-LUN ID is present (Yes in Step S3), the queue controller 11c removes the matching sub-LUN ID from the low priority queue 107 (Down queue 107b) (Step S4) and the process moves to Step S5. In contrast, in cases where a matching sub-LUN ID is not present (No in Step S3), the process moves to Step S5.

In Step S5, the queue controller 11c pushes all the above sub-LUNs (1) into the high priority queue 106 (predicted migration queue 106a). Further, the queue controller 11c pushes all the sub-LUNs (3) into the low priority queue 107 (the Down queue 107b) (Step S6). Steps S5 and S6 may be executed in the reverse order or in parallel with each other.

Next, the queue controller 11c compares the number of IO accesses to each above sub-LUN (2) with a threshold Th (Step S7), and pushes all the sub-LUNs each having the number of IO accesses equal to or more than the threshold Th into the high priority queue 106 (high IO accessing queue 106b) (Step S8).

In contrast, the queue controller 11c pushes all the sub-LUNs each having the number of IO accesses less than the threshold Th into the low priority queue 107 (miscellaneous queue 107a) (Step S9). Steps S8 and S9 may be executed in the reverse order or in parallel with each other. A succession of Steps S5 and S6 and a succession of Steps S7-S9 may be executed in the reverse order or in parallel with each other.

Then the queue controller 11c sleeps for a predetermined time (e.g., T seconds) (Step S10), and clears all the data in the queues (the high priority queue 106, the low priority queue 107, and the miscellaneous queue 107a) for Up process (Step S11). After that the process moves to Step S1. When a time period between the Step S11 after the sleep of the queue controller 11c and Step S10 (sleep) of the next loop as a single interval, the information received in Step S1 of each interval corresponds to a migration instruction directed to a migration target determined at the first timing. The process of Step S11 can be regarded as a process to remove a migration instruction determined at a second timing before a first timing from the queue 11d prior to storing information (information determined at the first timing) to be received in next Step S1 into the queue 11d.

Figure 22:
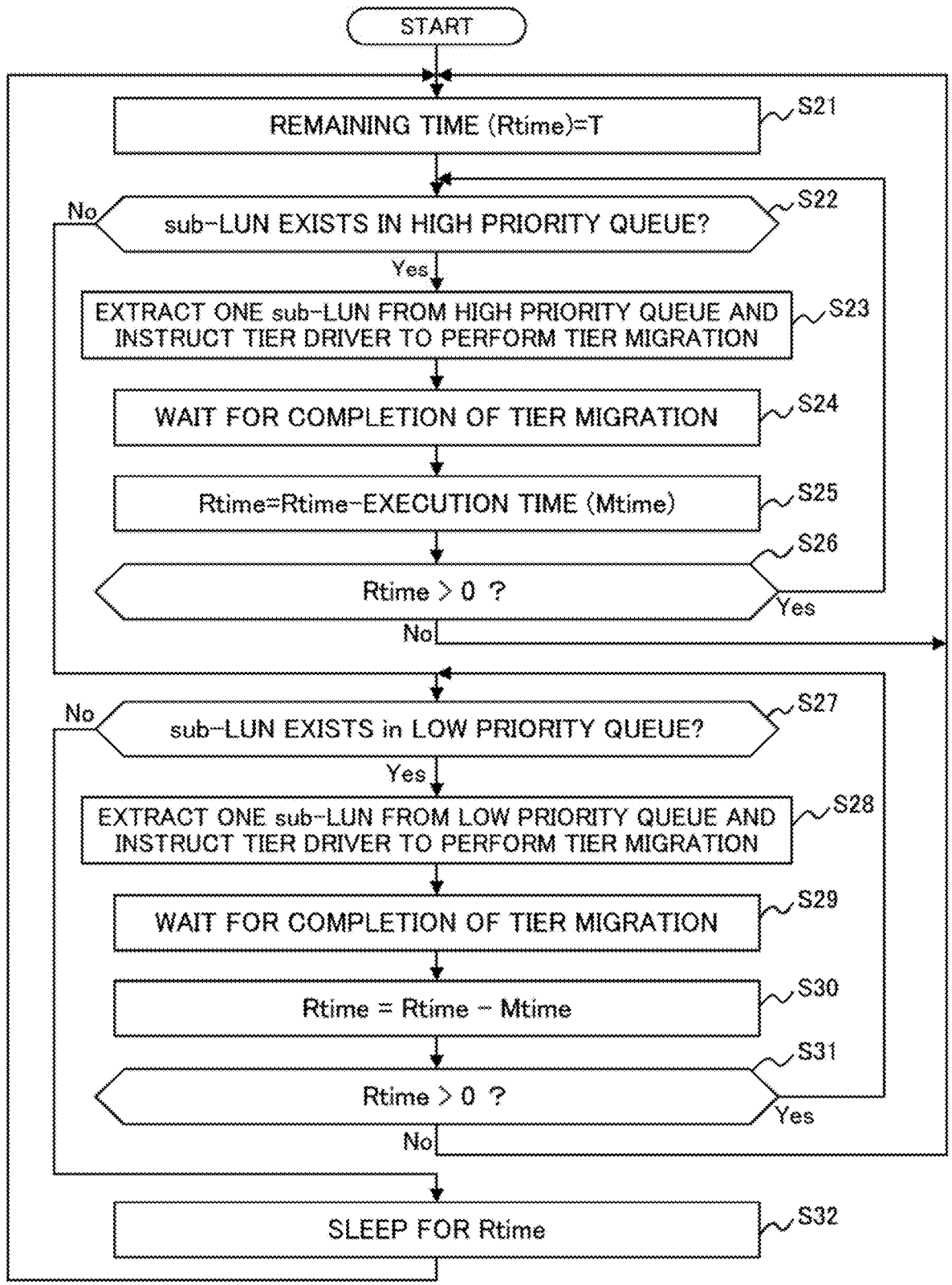
FIG. 22 is a flow diagram illustrating an example of operation of a process performed by a migration instructor.

<<2-2>> Example of Operation of Migration Instructor:

As illustrated in FIG. 22, the migration instructor 11e sets T (seconds) in the remaining time (Rtime) (Step S21) and determines whether a sub-LUN is present in the high priority queue 106 (Step S22).

In cases where a sub-LUN is present in the high priority queue 106 (Yes in Step S22), the migration instructor 11e extracts one sub-LUN from the high priority queue 106 and instructs the tier driver 12 to perform tier migration on the extracted sub-LUN (Step S23).

In relation to the priority order of extracting sub-LUNs from the high priority queue 106, a higher priority may be provided to either one of the predicted migration queue 106a or the high IO accessing queue 106b. In this case, the migration instructor 11e may extract all the sub-LUNs from one of the queues and then extract the sub-LUNs from the other queue. Otherwise, the same priority may be provided to the predicted migration queue 106a and the high IO accessing queue 106b. In this case, the migration instructor 11e may extract sub-LUNs alternately from the predicted migration queue 106a and the high IO accessing queue 106b.

The migration instructor 11e waits for the completion of tier migration (Step S24), and when being notified of the completion of the tier migration from the tier driver 12, for example, updates the remaining time Rtime by subtracting the execution time (Mtime, i.e., time taken to accomplish the tier migration) of the tier migration from the remaining Rtime (Step S25).

The migration instructor 11e determines whether or not the Rtime is larger than 0 (Step S26). In cases where the Rtime is larger than 0 (Yes in Step S26), the process moves to Step S22. In contrast, in cases where the Rtime is equal to or less than 0 (No in Step S26), the process moves to Step S21.

In step S22, in cases where a sub-LUN does not exist in the high priority queue 106 (No in Step S22), the migration instructor 11e determines whether or not a sub-LUN exits in the low priority queue 107 (Step S27).

In cases where a sub-LUN exits in the low priority queue 107 (Yes in Step S27), the migration instructor 11e extracts a single sub-LUN from the low priority queue 107 and instructs the tier driver 12 to perform the tier migration on the extracted sub-LUN (Step S28).

In relation to the priority order to extract a sub-LUN from the low priority queue 107, the same priority order may be provided to the miscellaneous queue 107a and the Down queue 107b. In this case, the migration instructor 11e may extract sub-LUNs alternately from the miscellaneous queue 107a and the Down queue 107b. Otherwise, a higher priority may be provided to either one of the miscellaneous queue 107a and the Down queue 107b. In this case, the migration instructor 11e may extract all the sub-LUNs from one of the queues first and then extract the sub-LUNs from the other queue.

The migration instructor 11e waits for the completion of tier migration (Step S29), and when being notified of the completion of the tier migration from the tier driver 12, for example, updates the remaining time Rtime by subtracting the execution time (Mtime) of the tier migration from the remaining Rtime (step S30).

The migration instructor 11e determines whether or not the Rtime is larger than 0 (Step S31). In cases where the Rtime is larger than 0 (Yes in Step S31), the process moves to Step S27. In contrast, in cases where the Rtime is equal to or less than 0 (No in Step S31), the process moves to Step S21.

In Step S27, in cases where a sub-LUN does not exist in the low priority queue 107 (No in Step S27), the migration instructor 11e sleeps for Rtime (Step S32) and the process moves to Step S21.

Figure 23:
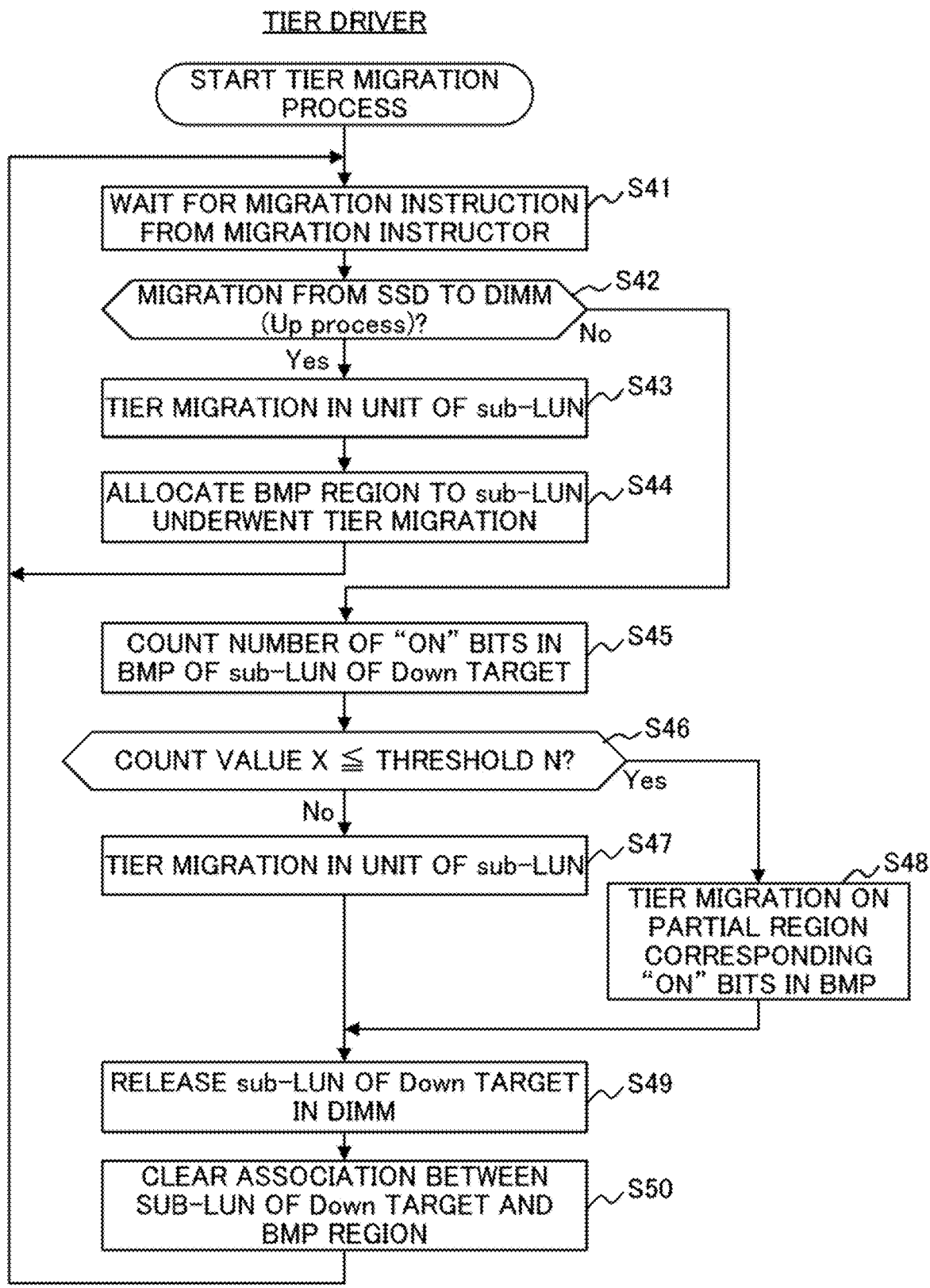
FIG. 23 is a flow diagram illustrating an example of operation of a tier migration process performed by a tier driver.

<<2-3>> Example of Operation of Tier Driver:

As illustrated in FIG. 23, in a tier migration process, the migration controller 122 of the tier driver 12 waits for a migration instruction from the migration instructor 11e (Step S41).

Upon receipt of the migration instruction, the migration controller 122 determines whether the instructed migration is migration (Up process) from the SSD 20 to the DIMM 30 (Step S42).

In cases where the instruction is migration (Up process) from the SSD 20 to the DIMM 30 (Yes in Step S42), the migration controller 122 executes tier migration (Up process) in a unit of a sub-LUN in obedience to the migration instruction (Step S43). At that time, the migration controller 122 transmits a forwarding instruction to forward data in units of sub-LUN to the migration processing unit 15.

The BMP manager 124 allocates a region in the BMP 123 to the sub-LUN underwent the tier migration (Step S44) and the process moves to Step S41.

In Step S42, the instruction is migration (Down process) from the DIMM 30 to the SSD 20 (No in Step S42), the migration region determiner 125 refers to a region of the BMP 123 which region is associated with the sub-LUN of the Down target. Then the migration region determiner 125 counts the number of bits set to be "ON" in the region of the BMP 123 (Step S45).

The migration region determiner 125 determines whether the count value X is threshold N or less (Step S46) and in cases where the count value X is more than threshold N (No in Step S46), notifies the migration controller 122 of the sub-LUN as a migration region. The migration controller 122 executes tier migration (Down process) in units of sub-LUN (Step S47) and the process moves to Step S49. In Step S47, the migration controller 122 transmits a forwarding instruction to forward data in units of sub-LUN to the migration processing unit 15.

In contrast, in cases where the count value X is equal to or less than threshold N (Yes in Step S46), the migration region determiner 125 notifies migration controller 122 of one or more partial regions associated with the one or more bits set to be "ON". The migration controller 122 executes tier migration (Down process) sequentially in units of partial region (Step S48) and the process moves to Step S49. In Step S48, the migration controller 122 transmits a forwarding instruction to forward data in units of partial region to the migration processing unit 15.

In Step S49, the migration controller 122 releases the sub-LUN of the Down target in the DIMM 30.

The BMP manager 124 clears the association between the sub-LUN of the Down target and the region of the BMP 123 (Step S50) and the process moves to Step S41. Here, Steps S49 and S50 may be executed in the reverse order or in parallel with each other.

Figure 24:
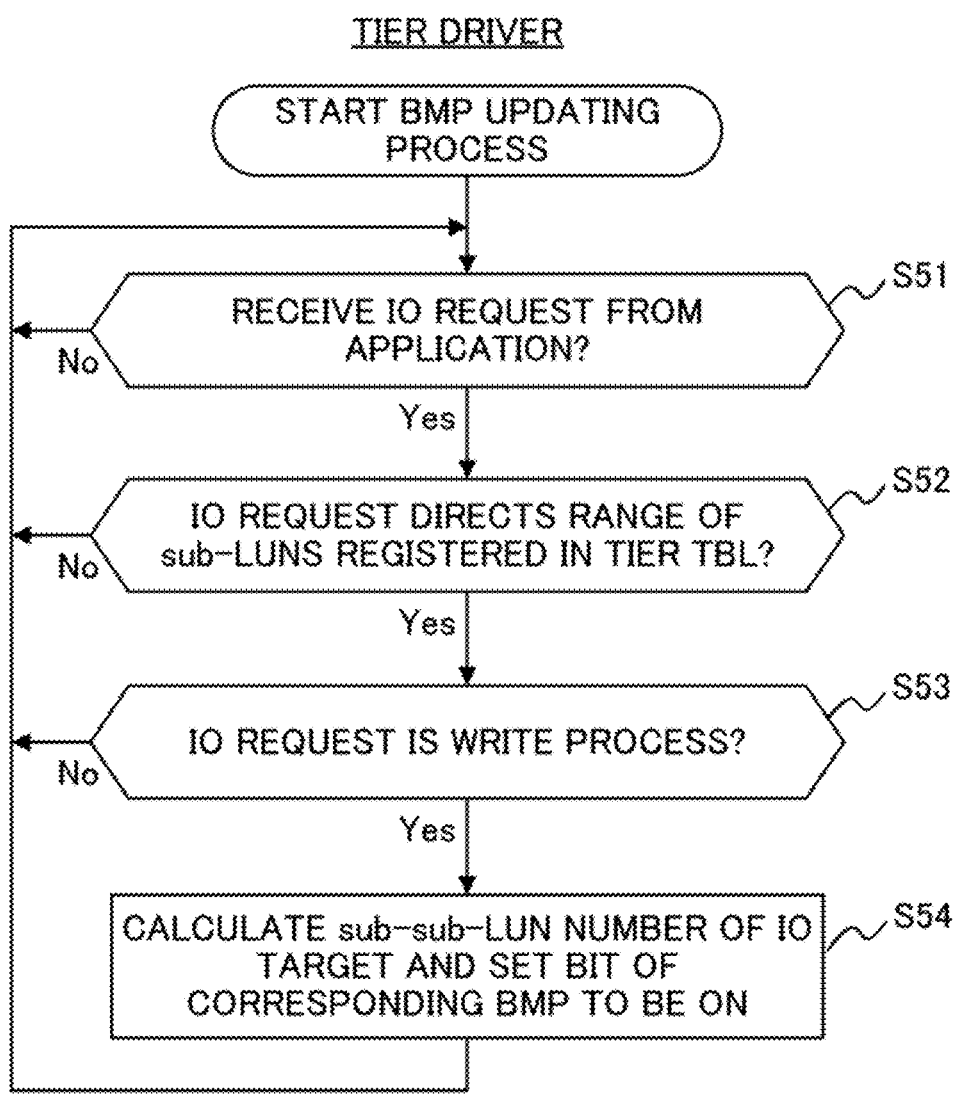
FIG. 24 is a flow diagram illustrating an example of operation of a bitmap updating process performed by a tier driver.

As illustrated in FIG. 24, in performing a BMP updating process, the BMP manager 124 waits for an IO request from the application (Step S51, No in Step S51).

Upon receipt an IO request from the application (Yes in Step S51), the BMP manager 124 determines whether the IO request directs a range of sub-LUNs registered in the tier TBL 126 by referring to the tier TBL 126 (Step S52). In cases where the IO request directs outside the range (No in Step S52), the process moves to Step S51.

In contrast, in cases where the IO request directs the range of the sub-LUNs registered in the tier TBL 126 (Yes in Step S52), the BMP manager 124 determines whether the IO request targets a writing process (Step S53). In cases where the IO request does not target a writing process (No in Step S53), the process moves to Step S51.

In cases where the IO request targets a writing process (Yes in Step S53), the BMP manager 124 calculates the number of the partial region of the target of the IO access request exemplified by a sub-sub-LUN number for the BMP 123 and sets the bit corresponding to the calculated sub-sub-LUN number in the BMP 123 to be "ON" (Step S54). Then the process moves to Step S51.

Figure 25:
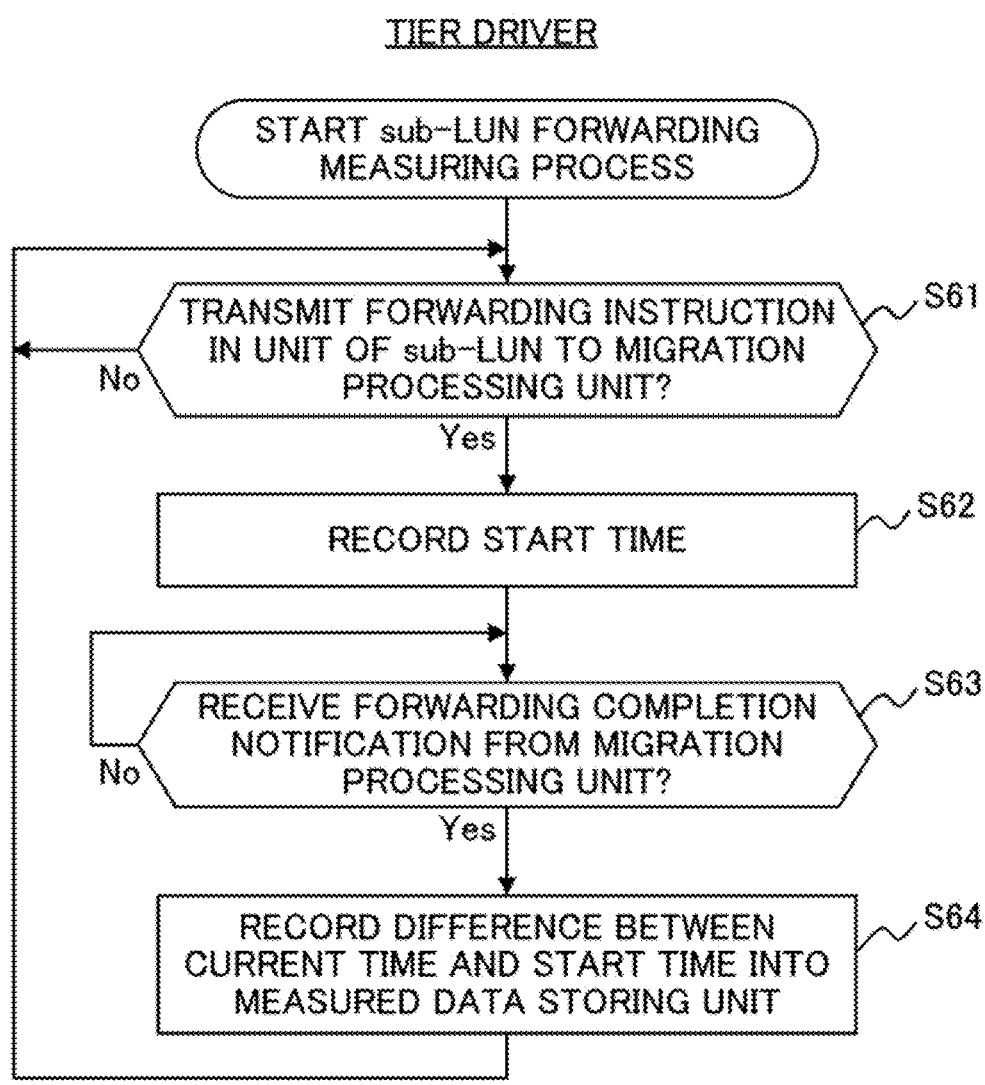
FIG. 25 is a flow diagram illustrating an example of operation of a sub-LUN forwarding measuring process performed by a tier driver.

As illustrated in FIG. 25, in performing a sub-LUN forwarding measuring process, the measure 122a of the migration controller 122 determines whether the migration controller 122 transmits a forwarding instruction to forward data in units of sub-LUN to the migration processing unit 15 (Step S61). In cases where the forwarding instruction to forward data in units of sub-LUN is not transmitted (No in Step S61), the process moves to Step S61.

In cases where the forwarding instruction to forward data in units of sub-LUN is transmitted (Yes in Step S61, see Step S47 of FIG. 23), the measure 122a records the start time (Step S62).

Next, the measure 122a determines whether to receive forwarding completion notification from the migration processing unit 15 (Step S63). In cases where the measure 122a does not receive forwarding completion notification (No in Step S63), the process moves to Step S63.

In cases where the measure 122a receives forwarding completion notification from the migration processing unit 15 (Yes in Step S63), the measure 122a calculates, as calculated data, the difference between the current time and the start time recorded in Step S62. Then the measure 122a records the calculated measured data into the measured data storing unit 122b (Step S64) and the process moves to Step S61.

Figure 26:
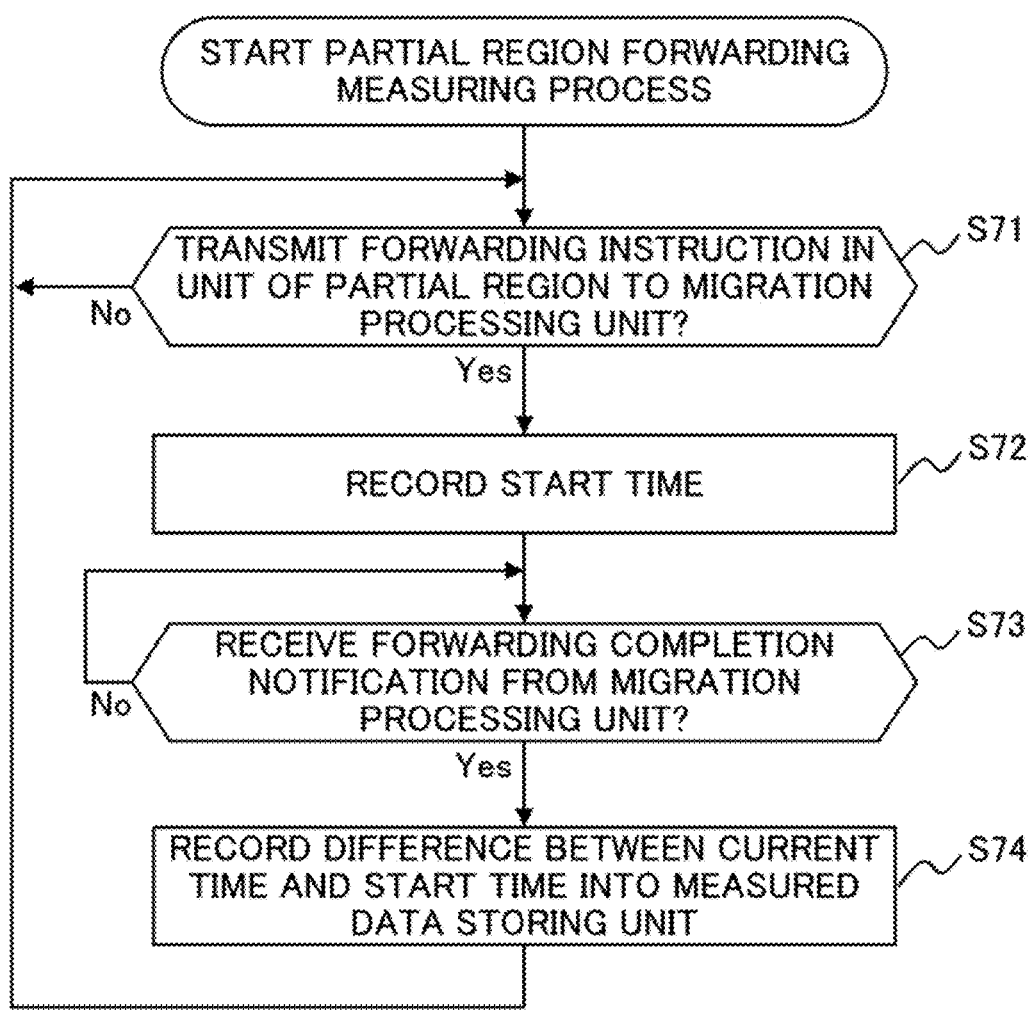
FIG. 26 is a flow diagram illustrating an example of operation of a partial region forwarding measuring process performed by a tier driver.

As illustrated in FIG. 26, in performing a partial region forwarding measuring process, the measure 122a determines whether the migration controller 122 transmits a forwarding instruction to forward data in units of partial region to the migration processing unit 15 (Step S71). In cases where the forwarding instruction to forward data in units of partial region is not transmitted (No in Step S71), the process moves to Step S71.

In cases where the forwarding instruction to forward data in units of partial region is transmitted (Yes in Step S71, see Step S48 of FIG. 23), the measure 122a records the start time (Step S72).

Next, the measure 122a determines whether to receive forwarding completion notification from the migration processing unit 15 (Step S73). In cases where the measure 122a does not receive forwarding completion notification (No in Step S73), the process moves to Step S73.

In cases where the measure 122a receives forwarding completion notification from the migration processing unit 15 (Yes in Step S73), the measure 122a calculates, as calculated data, the difference between the current time and the start time recorded in Step S72. Then the measure 122a records the calculated measured data into the measured data storing unit 122b (Step S74) and the process moves to Step S71.

Figure 27:
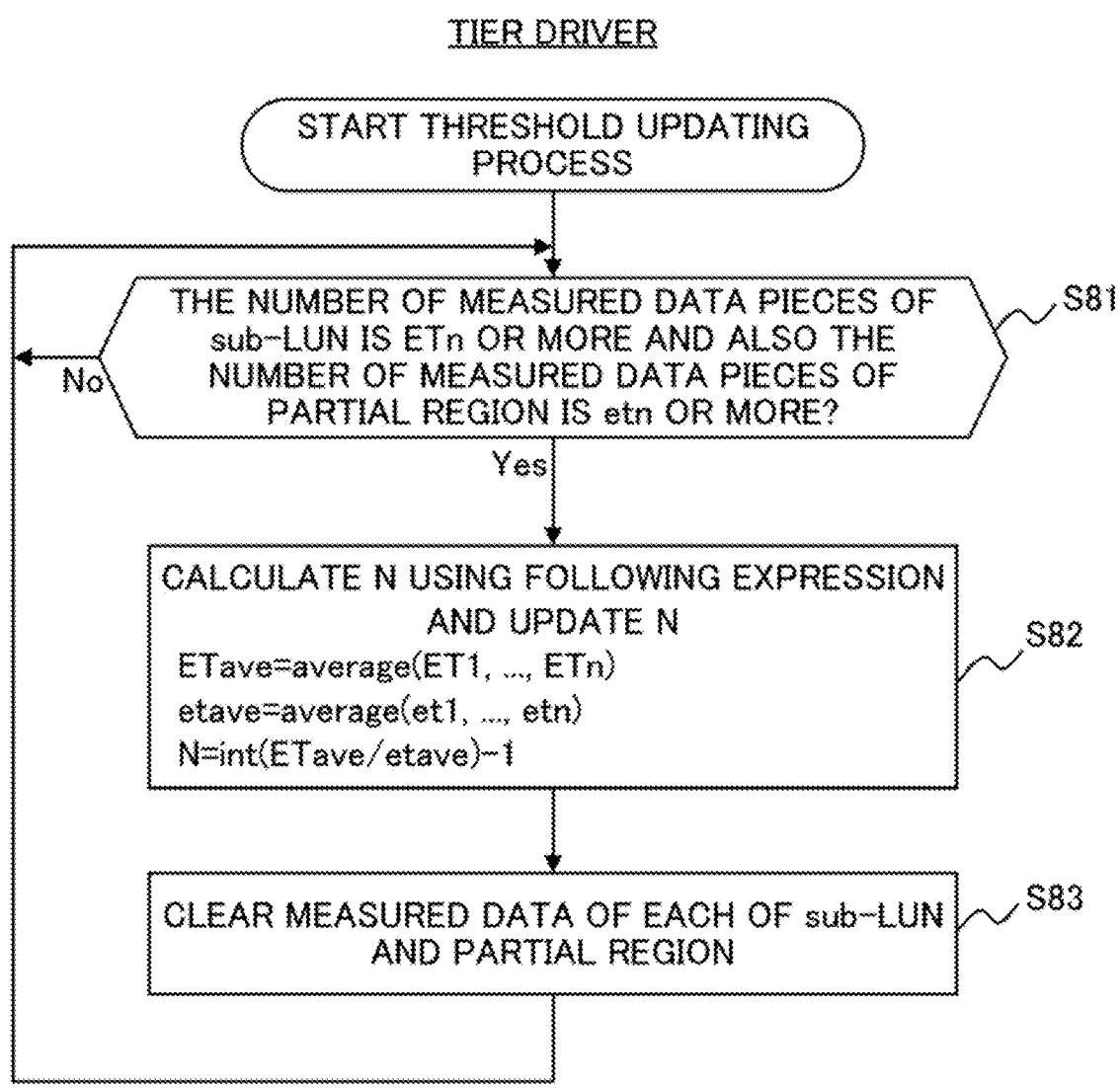
FIG. 27 is a flow diagram illustrating an example of operation of a threshold updating process performed by a tier driver.

As illustrating in FIG. 27, in performing a threshold updating process, the updater 122c determines whether the number of pieces of measured data of a sub-LUN is ETn or more and also the number of pieces of measured data of a partial region in the measured data storing unit 122b is etn or more (Step S81). In cases where the result of the determination is negative (No in Step S81), the process moves to Step S81.

In cases where the result of the determination is positive (Yes in Step S81), the updater 122c calculates the threshold N using the following Expressions (7) to (9) and updates the value N used in the migration region determiner 125 (Step S82).

$$ETave\text{-}average(ET1, ET2, \ldots, ETn) \quad (7)$$

$$etave\text{-}average(et1, et2, \ldots, etn) \quad (8)$$

$$N\text{-}int(ETave/etave)\text{-}1 \quad (9)$$

Then the updater 122c clears the pieces of measured data of sub-LUNs and partial regions stored in the measured data storing unit 122b (Step S83) and the process moves to Step S81.

Alternatively, in the above Step S81, the updater 122c may make a determination on one of the conditions that the number of pieces of measured data of a sub-LUN is ETn or more and the number of pieces of measured data of a partial region is etn or more, or may make a determination on another condition, <<3>> Miscellaneous:

The technique disclosed herein is not limited to the foregoing embodiment, and various changes and modification can be suggested without departing from the scope of the foregoing embodiment.

For example, description of the foregoing embodiment is made in relation to the tiered storage apparatus 1 using the SSD 20 and the DIMM 30, but the tiered storage apparatus 1 is not limited to this. Alternatively, the foregoing embodiment can be applied likewise to a tiered storage system including a cache memory and a main storing device. In other words, the foregoing embodiment can be applied not only to a tiered storage system including non-volatile storage devices but also similarly to a tiered storage system including volatile memories.

Alternative to the SSD 20 and the DIMM 30, the tiered storage apparatus 1 of the foregoing embodiment may be applied to storing devices having a difference in accessing speed. For example, the foregoing embodiment can be applied to, for example, a tiered storage apparatus including the SSD 20 and a HDD having a lower access speed than that of the SSD 20. Further alternatively, the foregoing embodiment may be applied to a tiered storage apparatus including the SSD 20 and a magnetic recording device, such as a tape drive, having a larger capacity than the SSD 20 but lower speed than the SSD 20.

Furthermore, description of the operation of the tiered storage controller 10 of the foregoing embodiment focuses on a single SSD 20 and a single DIMM 30. Alternatively, the foregoing embodiment can also be similarly applied to a tiered storage apparatus 1 including multiple SSDs 20 and multiple DIMMs 30.

The foregoing embodiment described above assumes that the tiered storage controller 10 uses the function of the Linux device-mapper, for example, but is not limited to this. Alternatively, the tiered storage apparatus 1 may use the function of another volume managing driver or another OS. The function to be used by the tiered storage apparatus 1 may be variously modified.

The functional blocks of the tiered storage controller 10 illustrated in FIGS. 2, 10, and 18 may be merged in an arbitrary combination or may each be divided.

The foregoing embodiment described above assumes that the migration determiner 11b includes the functions of the DB 101, the detector 102, the Up determiner 103, the Down determiner 104, and the predicted migration determiner 105 in the migration determiner 11b, but is not limited to this. For example, these functions are satisfactorily included in the tier manager 11. Alternatively, the queue controller 11c may be included in the migration determiner 11b or the queue 11d or may be distributedly included in the migration determiner 11b and the queue 11d.

The above description of the above present embodiment assumes that the functions of the measure 122a, the measured data storing unit 122b, and the updater 122c are involved in the migration controller 122. However, the present embodiment is not limited to this. Alternatively, these functions may be involved in the tier driver 12. Further alternatively, the migration region determiner 125 may be included in the migration controller 122.

Further, in the foregoing embodiment, the functions of the BMP 123, the BMP manager 124, and the migration region determiner 125 of the tier driver 12 can be regarded as functions independent from the tier manager 11. This means that a traditional tier manager used in place of the tier manager 11 can bring the same effects as the above-effects by the tier driver 12.

In the above description, the foregoing embodiment described above is assumed to be applied to a tiered storage apparatus, but the object of the foregoing embodiment is not limited to this. Alternatively, the foregoing embodiment can be likewise applied to a case where the first storing device exemplified by the DIMM in the foregoing embodiment is a cache memory and this alternative brings the same effects as those of the foregoing embodiment.

The foregoing embodiment can be carried out and manufactured by those ordinary skilled in the art referring to the above disclosure.

As one aspect, data migration between storing devices having difference capability can be efficiently accomplished.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
a first memory that stores management information managing whether a writing access to write data into a partial region of a plurality of partial regions of a storing region of a first storing device is present or absent, each of the partial regions having a second size and being obtained by dividing the storing region having a first size by a given value;
and a processor being coupled to the first memory and is configured to execute a procedure comprising:
in response to an execution instruction to migrate target data having the first size from the first storing device to a second storing device, which access speed is lower than an access speed of the first storing device,
when a number of accessed partial regions subjected to a writing access in a storing region of a plurality of storing regions of the target data is larger than a threshold, with reference to the management information, migrating the target data from the first storing device to the second storing device in a unit of the first size;
when the number of partial regions subjected to the writing access in the storing region of the target data is equal to or smaller than the threshold, migrating data in the accessed partial regions of the target data from the first storing device to the second storing device in a unit of the second size;
calculating a first migration time period, which data is migrated from the first storage device to the second device in a unit of the first size, and a second migration time period, which data is migrated from the first storing device to the second storing device in a unit of the second size; and
changing the threshold based on a result of the calculated first migration time period and second migration time period.

2. The information processing apparatus according to claim 1, wherein the changing changes the threshold based on the result of the calculating, at least one of in a case where a number of a plurality of the first migration time periods calculated for a plurality of the target data reaches a first given number and in a case where a number of a plurality of the second migration time periods calculated for the plurality of target data reaches a second given number.

3. The information processing apparatus according to claim 1, wherein the changing changes the threshold based on a result of dividing an average value of the plurality of first migration time periods by an average value of the plurality of second migration time periods.

4. The information processing apparatus according to claim 1, further comprising a second memory that stores the result of the calculating, wherein
the changing changes the threshold based on the result of the calculating stored in the second memory and, after changing the threshold, clears the result stored in the second memory.

5. The information processing apparatus according to claim 1, further comprising a queue that stores a migration instruction to perform a migration process between the first storing device and the second storing device, wherein
the procedure further comprises:
determining first target data of the migration process to be migrated;
storing a first migration instruction directed to the first target data into the queue;
deleting, before a timing of storing a second migration instruction determined at a first timing into the queue, a third migration instruction to migrate third target data from the second storing device to the first storing device, determined at a second timing prior to the first timing from among migration instructions stored in the queue; and
reading the first migration instruction stored in the queue and controlling execution of the migration process performed in response to the first migration instruction read from the queue, and
target data for a migration instruction instructing migration from the second storing device to the first storing device is one of data undergoing access concentration in the first storing device and data predicted to undergo access concentration.

6. A non-transitory computer-readable storing medium having stored therein an information processing program that causes a computer to execute a procedure, the procedure comprising:

storing, into a first memory, management information managing whether a writing access to write data into a partial region of a plurality of partial regions in a storing region of a first storing device is present or absent, each of the partial regions has a second size and being obtained by dividing the storing region having a first size by a given value;

in response to an execution instruction to migrate target data having the first size from the first storing device to a second storing device, which access speed is lower than access speed of the first storing device, when a number of accessed partial regions subjected to a writing access in a storing region of a plurality of storing regions of the target data is larger than a threshold, with reference to the management information, migrating the target data from the first storing device to the second storing device in a unit of the first size;

when the number of partial regions subjected to the writing access in the storing region of the target data is equal to or smaller than the threshold, migrating data in the accessed partial regions of the target data from the first storing device to the second storing device in a unit of the second size;

calculating a first migration time period, which data is migrated from the first storage device to the second device in a unit of the first size, and a second migration time period, which data is migrated from the first storing device to the second storing device in a unit of the second size; and changing the threshold based on a result of the calculated first migration time period and second migration time period.

7. The non-transitory computer-readable storing medium according to claim 6, wherein the changing changes the threshold based on the result of the calculating, at least one of in a case where a number of a plurality of the first migration time periods calculated for a plurality of the target data reaches a first given number and in a case where a number of a plurality of the second migration time periods calculated for the plurality of target data reaches a second given number.

8. The non-transitory computer-readable storing medium according to claim 6, wherein the changing changes the threshold based on a result of dividing an average value of the plurality of first migration time periods by an average value of the plurality of second migration time periods.

9. The non-transitory computer-readable storing medium according to claim 6, the procedure further comprising storing the result of the calculating into a second memory, wherein the changing changes the threshold based on the result of the calculating stored in the second memory and, after changing the threshold, clears the result stored in the second memory.

10. The non-transitory computer-readable storing medium according to claim 6, the procedure further comprising:

determining target data of the migration process to be migrated between a first storing device and the second storing device;

storing a first migration instruction directed to first target data determined at a first timing into a queue;

deleting, before a timing of storing a second migration instruction determined at the first timing into the queue, a third migration instruction to migrate third target data from the second storing device to the first storing device, determined at a second timing prior to the first timing from among migration instructions stored in the queue; and reading the first migration instruction stored in the queue and controlling execution of the migration process performed in response to the first migration instruction read from the queue, and target data for a migration instruction instructing migration from the second storing device to the first storing device is one of data undergoing access concentration in the first storing device and data predicted to undergo access concentration.

* * * * *